US010392849B2

(12) United States Patent
Xiao et al.

(10) Patent No.: US 10,392,849 B2
(45) Date of Patent: Aug. 27, 2019

(54) ASSEMBLY AND METHOD TO SLOW DOWN AND GENTLY CLOSE DOOR

(71) Applicant: FORD GLOBAL TECHNOLOGIES, LLC, Dearborn, MI (US)

(72) Inventors: Jinxiong Xiao, Palo Alto, CA (US); Onoyom Essien Ekanem, White Lake, MI (US); Howard Paul Tsvi Linden, Southfield, MI (US); Muhammad Omer Kahn, Ypsilanti, MI (US); Christopher Matthew Radjewski, Macomb Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 394 days.

(21) Appl. No.: 15/408,532

(22) Filed: Jan. 18, 2017

(65) Prior Publication Data

US 2018/0202212 A1 Jul. 19, 2018

(51) Int. Cl.

| | |
|---|---|
| ***E05F 15/603*** | (2015.01) |
| ***E05F 5/02*** | (2006.01) |
| ***E05F 3/00*** | (2006.01) |
| ***E05F 15/611*** | (2015.01) |
| *E05F 15/60* | (2015.01) |

(52) U.S. Cl.

CPC ................ *E05F 5/025* (2013.01); *E05F 3/00* (2013.01); *E05F 15/611* (2015.01); *B60Y 2400/42* (2013.01); *E05Y 2201/21* (2013.01); *E05Y 2201/216* (2013.01); *E05Y 2201/266* (2013.01); *E05Y 2201/462* (2013.01); *E05Y 2400/20* (2013.01); *E05Y 2400/32* (2013.01); *E05Y 2400/36* (2013.01); *E05Y 2900/531* (2013.01)

(58) Field of Classification Search

USPC .................................................. 318/466–469

See application file for complete search history.

(56) References Cited

U.S. PATENT DOCUMENTS

| | | | |
|---|---|---|---|
| 1,543,935 | A | 6/1925 | McGee |
| 1,941,454 | A | 1/1934 | Ainsworth |

(Continued)

FOREIGN PATENT DOCUMENTS

| | | |
|---|---|---|
| CA | 2034320 | 11/1994 |
| CN | 101403271 | 4/2009 |

(Continued)

OTHER PUBLICATIONS

Steeven Zeiß, Alexander Marinc, Andreas Braun, Tobias Große-Puppendahl, Sebastian Beck; “A Gesture-based Door Control Using Capacitive Sensors”; Fraunhofer-Institut für Graphische Datenverarbeitung IGD; pp. 1-10; date unknown.

(Continued)

*Primary Examiner* — Bentsu Ro

(74) *Attorney, Agent, or Firm* — Vichit Chea; Price Heneveld LLP

(57) ABSTRACT

An improved selective power assist device includes a controller for controlling a motor selectively coupled to the door and a clutch interposed between a drive shaft and a motor shaft, each having an angular velocity, whereby the motor is operatively coupled with and decoupled from the door. A brake assembly is disposed to synchronize the angular velocities of the drive shaft and the motor shaft allowing the clutch to operatively couple the motor with the door.

20 Claims, 17 Drawing Sheets

(56) References Cited

U.S. PATENT DOCUMENTS

| | | | |
|---|---|---|---|
| 2,013,418 | A | 9/1935 | Moore |
| 2,032,600 | A | 3/1936 | Smith |
| 2,032,724 | A | 3/1936 | Sharpe |
| 2,138,521 | A | 11/1938 | Ellis |
| 2,170,014 | A | 8/1939 | Ellis |
| 2,237,046 | A | 4/1941 | Breitenwischer |
| 2,243,914 | A | 6/1941 | Martin et al. |
| 2,290,331 | A | 7/1942 | Jacobs |
| 2,321,409 | A | 6/1943 | Moore |
| 2,693,616 | A | 11/1954 | Cormwell et al. |
| 2,721,353 | A | 10/1955 | Mackintosh |
| 2,724,143 | A | 11/1955 | Galla |
| 2,758,835 | A | 8/1956 | Wikkerink |
| 2,787,019 | A | 4/1957 | Galla |
| 2,820,241 | A | 1/1958 | Schlage |
| 2,860,369 | A | 11/1958 | Galla |
| 2,874,960 | A | 2/1959 | Durbin et al. |
| 2,915,777 | A | 12/1959 | Allen |
| 2,980,945 | A | 4/1961 | Hollar, Jr. |
| 3,012,269 | A | 12/1961 | Bartel |
| 3,023,854 | A | 3/1962 | Lohr |
| 3,051,983 | A | 9/1962 | Dale |
| 3,061,362 | A | 10/1962 | Kunimori Maruyama |
| 3,114,541 | A | 12/1963 | Coffey |
| 3,141,662 | A | 7/1964 | Wise |
| 3,284,950 | A | 11/1966 | Gute |
| 3,344,554 | A | 10/1967 | Misaka et al. |
| 3,357,137 | A | 12/1967 | Lombardi et al. |
| 3,369,833 | A | 2/1968 | Schaldenbrand |
| 3,425,161 | A | 2/1969 | Catlett et al. |
| 3,643,289 | A | 2/1972 | Lohr |
| 3,645,042 | A | 2/1972 | Bolli |
| 3,653,154 | A | 4/1972 | Hayday |
| 3,874,117 | A | 4/1975 | Boehm |
| 3,895,281 | A | 7/1975 | Corbaz |
| 3,934,306 | A | 1/1976 | Farris |
| 3,979,790 | A | 9/1976 | Chiarappa |
| 3,980,331 | A | 9/1976 | Kennedy et al. |
| 3,996,698 | A | 12/1976 | Rees et al. |
| 4,007,557 | A | 2/1977 | Davis et al. |
| 4,048,695 | A | 9/1977 | Juilfs et al. |
| 4,078,770 | A | 3/1978 | Yates et al. |
| 4,121,382 | A | 10/1978 | Dietrich et al. |
| 4,143,497 | A | 3/1979 | Offenbacher |
| 4,194,264 | A | 3/1980 | Stoffregen |
| 4,220,051 | A | 9/1980 | Catlett |
| 4,348,835 | A | 9/1982 | Jones et al. |
| 4,386,398 | A | 5/1983 | Matsuoka et al. |
| 4,429,490 | A | 2/1984 | Zunkel |
| 4,441,376 | A | 4/1984 | Tobey |
| 4,458,446 | A | 7/1984 | Mochida |
| 4,488,753 | A | 12/1984 | Koike |
| 4,497,137 | A | 2/1985 | Nelson |
| 4,498,033 | A | 2/1985 | Aihara et al. |
| 4,501,012 | A | 2/1985 | Kishi et al. |
| 4,501,090 | A | 2/1985 | Yoshida et al. |
| 4,551,946 | A | 11/1985 | Yoshida et al. |
| 4,658,468 | A | 4/1987 | Tillmann et al. |
| 4,658,545 | A | 4/1987 | Ingham et al. |
| 4,663,801 | A | 5/1987 | Malopolski, Jr. |
| 4,670,941 | A | 6/1987 | Peterson |
| 4,672,715 | A | 6/1987 | Beckwith |
| 4,674,230 | A | 6/1987 | Takeo et al. |
| 4,727,679 | A | 3/1988 | Kornbrekke et al. |
| 4,763,111 | A | 8/1988 | Matsuo et al. |
| 4,785,493 | A | 11/1988 | Tillmann et al. |
| 4,788,743 | A | 12/1988 | Okumrua |
| 4,833,755 | A | 5/1989 | Bonin |
| 4,841,600 | A | 6/1989 | Sasamura et al. |
| 4,899,945 | A | 2/1990 | Jones |
| 4,912,806 | A | 4/1990 | Orii et al. |
| 4,952,080 | A | 8/1990 | Boiucaner et al. |
| 4,972,629 | A | 11/1990 | Merendino et al. |
| 4,973,894 | A | 11/1990 | Johansson |
| 5,036,620 | A | 8/1991 | Beran |
| 5,040,331 | A | 8/1991 | Merendino et al. |
| 5,063,337 | A | 11/1991 | Evin |
| 5,074,010 | A | 12/1991 | Gignac et al. |
| 5,152,030 | A | 10/1992 | Cogo |
| 5,173,991 | A | 12/1992 | Carswell |
| 5,193,647 | A | 3/1993 | O'Brien, II |
| 5,236,234 | A | 8/1993 | Norman |
| 5,243,735 | A | 9/1993 | O'Brien, II |
| 5,272,348 | A | 12/1993 | Miller |
| 5,278,480 | A | 1/1994 | Murray |
| 5,317,835 | A | 6/1994 | Dupuy et al. |
| 5,355,628 | A | 10/1994 | Dranchak |
| 5,369,911 | A | 12/1994 | Fortunato |
| 5,392,562 | A | 2/1995 | Carambula |
| 5,396,158 | A | 3/1995 | Long et al. |
| 5,434,487 | A | 7/1995 | Long et al. |
| 5,474,344 | A | 12/1995 | Lee |
| 5,497,461 | A | 3/1996 | Linde et al. |
| 5,509,175 | A | 4/1996 | Baughan et al. |
| 5,543,692 | A | 8/1996 | Howie et al. |
| 5,594,316 | A | 1/1997 | Hayashida |
| 5,634,296 | A | 6/1997 | Hebda |
| 5,687,507 | A | 11/1997 | Beran |
| 5,727,287 | A | 3/1998 | Hosken et al. |
| 5,770,934 | A | 6/1998 | Theile |
| 5,787,636 | A | 8/1998 | Buchanan, Jr. |
| 5,789,887 | A | 8/1998 | Elischewski |
| 5,801,340 | A | 9/1998 | Peter |
| 5,838,129 | A | 11/1998 | Luh |
| 5,862,570 | A | 1/1999 | Lezuch et al. |
| 5,878,530 | A | 3/1999 | Eccleston et al. |
| 5,910,075 | A | 6/1999 | Arnell et al. |
| 5,913,763 | A | 6/1999 | Beran et al. |
| 5,930,954 | A | 8/1999 | Hebda |
| 5,956,249 | A | 9/1999 | Beran et al. |
| 5,977,732 | A | 11/1999 | Matsumoto |
| 6,006,475 | A | 12/1999 | Schwantes et al. |
| 6,038,895 | A | 3/2000 | Menke et al. |
| 6,061,964 | A | 5/2000 | Arnell et al. |
| 6,065,185 | A | 5/2000 | Breed et al. |
| 6,067,753 | A | 5/2000 | Hebda |
| 6,145,354 | A | 11/2000 | Kondo et al. |
| 6,247,271 | B1 | 6/2001 | Fioritto et al. |
| 6,275,231 | B1 | 8/2001 | Obradovich |
| 6,305,737 | B1 | 10/2001 | Corder et al. |
| 6,341,807 | B2 | 1/2002 | Cetnar et al. |
| 6,370,732 | B1 | 4/2002 | Yezersky et al. |
| 6,401,392 | B1 | 6/2002 | Yuge |
| 6,430,871 | B1 | 8/2002 | Hebda |
| 6,435,575 | B1 | 8/2002 | Pajak et al. |
| 6,442,902 | B1 | 9/2002 | Van Den Oord |
| 6,452,353 | B1 | 9/2002 | Calamatas |
| 6,467,126 | B1 | 10/2002 | Yezersky et al. |
| 6,469,499 | B2 | 10/2002 | Delaporte |
| 6,481,160 | B1 | 11/2002 | Kowalczyk |
| 6,498,970 | B2 | 12/2002 | Colmenarez et al. |
| 6,530,178 | B1 | 3/2003 | Kowalczyk et al. |
| 6,553,717 | B2 | 4/2003 | St John et al. |
| 6,618,997 | B2 * | 9/2003 | Yokomori ............. E05F 15/646 477/203 |
| 6,624,605 | B1 | 9/2003 | Powder et al. |
| 6,634,140 | B1 | 10/2003 | Sellman |
| 6,719,356 | B2 | 4/2004 | Cleland et al. |
| 6,777,958 | B2 | 5/2004 | Haag et al. |
| 6,754,990 | B2 | 6/2004 | Pedemonte |
| 6,786,006 | B2 | 9/2004 | Kowalczyk et al. |
| 6,786,671 | B1 | 9/2004 | Eckendorff |
| 6,794,837 | B1 | 9/2004 | Whinnery et al. |
| 6,799,669 | B2 * | 10/2004 | Fukumura ............... F16D 48/06 192/105 R |
| 6,822,410 | B2 | 11/2004 | Whinnery et al. |
| 6,928,694 | B2 | 8/2005 | Breed et al. |
| 6,938,372 | B2 | 9/2005 | Kennedy et al. |
| 7,026,777 | B2 * | 4/2006 | Matsui ...................... E05F 7/04 318/443 |
| 7,034,682 | B2 | 4/2006 | Beggs et al. |
| 7,040,473 | B2 * | 5/2006 | Schachtl .................. E05F 5/00 192/84.91 |
| 7,045,764 | B2 | 5/2006 | Beggs et al. |

(56) References Cited

U.S. PATENT DOCUMENTS

| | | | |
|---|---|---|---|
| 7,068,146 | B2 | 6/2006 | Sasaki et al. |
| 7,132,642 | B2 | 11/2006 | Shank et al. |
| 7,175,227 | B2 | 2/2007 | Menard |
| 7,193,509 | B2 | 3/2007 | Bartels et al. |
| 7,215,529 | B2 | 5/2007 | Rosenau |
| 7,273,207 | B2 | 9/2007 | Studer |
| 7,280,035 | B2 | 10/2007 | McLain et al. |
| 7,298,107 | B2 | 11/2007 | McMahon |
| 7,310,911 | B1 | 12/2007 | Sellman |
| 7,316,096 | B2 | 1/2008 | Houser et al. |
| 7,320,497 | B2 | 1/2008 | Zinn et al. |
| 7,339,336 | B2 | 3/2008 | Gregori |
| 7,342,373 | B2 | 3/2008 | Newman et al. |
| 7,367,161 | B1 | 5/2008 | Jones |
| 7,377,557 | B2 | 5/2008 | Shelley et al. |
| 7,388,179 | B2 | 6/2008 | Alton et al. |
| 7,400,153 | B2 | 7/2008 | Shoji et al. |
| 7,405,530 | B2 | 7/2008 | Keller, Jr. |
| 7,438,346 | B1 | 10/2008 | Breed |
| 7,439,632 | B2 | 10/2008 | Ogino et al. |
| 7,509,772 | B2 | 3/2009 | Ohta et al. |
| 7,538,506 | B2 | 5/2009 | Zinn et al. |
| 7,540,554 | B2 | 6/2009 | Bals |
| 7,686,378 | B2 | 3/2010 | Gisler et al. |
| 7,726,722 | B2 | 6/2010 | Ray |
| 7,874,609 | B2 | 1/2011 | Whinnery |
| 7,886,409 | B2 | 2/2011 | Yip |
| 8,077,022 | B2 | 12/2011 | Baruco et al. |
| 8,132,844 | B2 | 3/2012 | Sonnek et al. |
| 8,159,231 | B2 | 4/2012 | Sakamaki |
| 8,169,169 | B2 | 5/2012 | Hass et al. |
| 8,169,317 | B2 | 5/2012 | Lemerand et al. |
| 8,186,013 | B2 | 5/2012 | Yip |
| 8,234,817 | B2 | 8/2012 | Neundorf et al. |
| 8,237,544 | B2 | 8/2012 | Nakashima |
| 8,284,022 | B2 | 10/2012 | Kachouh |
| 8,397,581 | B2 | 3/2013 | Ruby, III et al. |
| 8,511,739 | B2 | 8/2013 | Brown et al. |
| 8,615,927 | B2 | 12/2013 | Ezzat et al. |
| 8,641,125 | B2 | 2/2014 | Jimenez et al. |
| 8,651,461 | B2 | 2/2014 | Christenson et al. |
| 8,819,992 | B2 | 9/2014 | De Coi et al. |
| 9,080,363 | B2 | 7/2015 | Reed et al. |
| 9,353,566 | B2 | 5/2016 | Miu et al. |
| 2001/0004164 | A1 | 6/2001 | Mattsson |
| 2002/0039008 | A1 | 4/2002 | Edgar et al. |
| 2002/0104266 | A1 | 8/2002 | Ranaudo |
| 2002/0105319 | A1 | 8/2002 | Delaporte |
| 2003/0025469 | A1 | 2/2003 | Zhou et al. |
| 2003/0038544 | A1 | 2/2003 | Spurr |
| 2003/0050151 | A1 | 3/2003 | Fukumura et al. |
| 2003/0222610 | A1 | 12/2003 | Whinnery |
| 2003/0222614 | A1 | 12/2003 | Whinnery et al. |
| 2003/0222758 | A1 | 12/2003 | Willats et al. |
| 2003/0225497 | A1 | 12/2003 | Whinnery |
| 2004/0068935 | A1 | 4/2004 | Ichikawa et al. |
| 2004/0124662 | A1 | 7/2004 | Cleland et al. |
| 2005/0132652 | A1 | 6/2005 | Tong |
| 2005/0161973 | A1 | 7/2005 | Yokomori |
| 2005/0168010 | A1 | 8/2005 | Cleland et al. |
| 2005/0174077 | A1 | 8/2005 | Haag et al. |
| 2005/0235565 | A1 | 10/2005 | Hoffmann |
| 2005/0242618 | A1 | 11/2005 | Menard |
| 2005/0280284 | A1 | 12/2005 | McLain et al. |
| 2006/0181108 | A1 | 8/2006 | Cleland et al. |
| 2006/0230574 | A1 | 10/2006 | Murayama et al. |
| 2006/0288642 | A1 | 12/2006 | Marentette |
| 2007/0090654 | A1 | 4/2007 | Eaton |
| 2007/0186480 | A1 | 8/2007 | Freeman |
| 2007/0192038 | A1 | 8/2007 | Kameyama |
| 2007/0285812 | A1 | 12/2007 | Foote et al. |
| 2008/0211519 | A1 | 9/2008 | Kurumado et al. |
| 2008/0277964 | A1 | 11/2008 | Kanno et al. |
| 2008/0295408 | A1 | 12/2008 | Heissler |
| 2008/0296927 | A1 | 12/2008 | Gisler et al. |
| 2008/0309120 | A1 | 12/2008 | Kohlstrand et al. |
| 2009/0113797 | A1 | 5/2009 | Hoermann |
| 2009/0153151 | A1 | 6/2009 | Cho et al. |
| 2009/0255185 | A1 | 10/2009 | Schachtl et al. |
| 2009/0260289 | A1 | 10/2009 | Carpenter et al. |
| 2010/0101147 | A1 | 4/2010 | Vankrunkelsven |
| 2010/0224117 | A1 | 9/2010 | Christensen et al. |
| 2011/0203181 | A1 | 8/2011 | Magner et al. |
| 2011/0260848 | A1 | 10/2011 | Rodriguez Barros et al. |
| 2011/0295469 | A1 | 12/2011 | Rafii et al. |
| 2012/0042572 | A1 | 2/2012 | Yuge |
| 2012/0144744 | A1 | 6/2012 | No |
| 2012/0179366 | A1 | 7/2012 | Oakley |
| 2013/0031747 | A1 | 2/2013 | Gobart et al. |
| 2013/0074412 | A1 | 3/2013 | Wellborn et al. |
| 2013/0091768 | A1 | 4/2013 | Houser et al. |
| 2013/0127479 | A1 | 5/2013 | Grills et al. |
| 2013/0138303 | A1 | 5/2013 | McKee et al. |
| 2013/0239485 | A1 | 9/2013 | Reed et al. |
| 2014/0000165 | A1 | 1/2014 | Patel et al. |
| 2014/0150581 | A1 | 6/2014 | Scheuring et al. |
| 2014/0297060 | A1 | 10/2014 | Schmidt et al. |
| 2014/0373454 | A1 | 12/2014 | Sasaki |
| 2015/0055349 | A1 | 2/2015 | Mayer |
| 2015/0240548 | A1 | 8/2015 | Bendel et al. |
| 2016/0010379 | A1 | 1/2016 | Sauerwein et al. |
| 2017/0030126 | A1 | 2/2017 | Elie et al. |
| 2017/0030131 | A1 | 2/2017 | Elie et al. |
| 2017/0030132 | A1 | 2/2017 | Elie et al. |

FOREIGN PATENT DOCUMENTS

| | | |
|---|---|---|
| CN | 201343938 | 11/2009 |
| CN | 202294674 | 7/2012 |
| CN | 103132847 | 6/2013 |
| CN | 103269914 | 8/2013 |
| CN | 203143980 | 8/2013 |
| CN | 103422764 | 12/2013 |
| CN | 203551964 | 4/2014 |
| CN | 203580775 | 5/2014 |
| DE | 4119579 | 12/1992 |
| DE | 4207706 | 9/1993 |
| DE | 10004161 | 8/2001 |
| DE | 10038803 | 2/2002 |
| DE | 102007062473 | 7/2009 |
| EP | 0397300 | 11/1990 |
| EP | 1205620 | 5/2002 |
| EP | 2174814 | 4/2010 |
| EP | 1265772 | 12/2010 |
| EP | 2287430 | 2/2011 |
| EP | 1899565 | 10/2011 |
| EP | 2583848 | 4/2013 |
| EP | 2765112 | 8/2014 |
| FR | 2873074 | 1/2006 |
| JP | 07285789 | 10/1995 |
| JP | 2000080828 | 3/2000 |
| JP | 2000318444 | 11/2000 |
| JP | 2004176426 | 6/2004 |
| JP | 2009161959 | 7/2009 |
| JP | 2010095383 | 4/2010 |
| JP | 2013007171 | 1/2013 |
| JP | 2013028903 | 2/2013 |
| JP | 2014129037 | 4/2014 |
| JP | 2014148842 | 8/2014 |
| KR | 20020048811 | 6/2002 |
| KR | 20130068538 | 6/2013 |
| WO | 201010098620 | 9/2010 |
| WO | 2011019235 | 2/2011 |
| WO | 2013013313 | 1/2013 |
| WO | 2013074901 | 5/2013 |

OTHER PUBLICATIONS

Abd Manan Bin Ahmad; "The Design and Development of a System for Controlling Automotive Functions using Speech Recognition"; Universiti Teknologi Malaysia; pp. 1-100; 2006.

(56) References Cited

OTHER PUBLICATIONS

Haleem, M.S.; "Voice Controlled Automation System"; IEEE International; Dept. of Electron. Eng., NED Univ. of Eng. & Technol.; Multitopic Conference; Print ISBN: 978-1-4244-2823-6; pp. 1-2; Dec. 23-24, 2008.
"InnoTrans 2014: Safety on Vehicle Doors with Non-Touch Detection System from Mayser"; Mayser Safety Technology; pp. 1-1; Aug. 4, 2014
Bogdan Popa; "How BMWs Soft Close Doors Work"; Autoevolution; pp. 1-6; Aug. 18, 2012.

* cited by examiner

ASSEMBLY AND METHOD TO SLOW DOWN AND GENTLY CLOSE DOOR

FIELD OF THE INVENTION

The present invention generally relates to a device for use on an automotive vehicle door, and more particularly, to a power assist device for the vehicle door providing both opening and closing assistance in either a power mode or a manual mode, while controlling the velocity of the swing of the vehicle door when closing in the manual mode.

BACKGROUND OF THE INVENTION

Motor vehicle doors may include device(s) to assist in opening and closing a vehicle door. However, known devices generally do not provide operation of opening and closing a vehicle door in both a manual mode and powered mode. Thus, a device is desired, wherein the door may be opened and closed under the control of a power assistance device that is coupled to one or more hinges of the vehicle door, and further wherein the power assistance device allows a user to control door swing behavior manually. A device having a confined overall package size is desired to carry out the power assist functionality within the standard confines of a vehicle door to vehicle body spacing.

SUMMARY OF THE INVENTION

According to one aspect of the present invention, an improved selective power assist device is provided. A motor vehicle door comprises a controller for controlling a motor selectively coupled to the door and a clutch interposed between a drive shaft and a motor shaft, each having an angular velocity, whereby the motor is operatively coupled with and decoupled from the door. A brake assembly is disposed to synchronize the angular velocities of the drive shaft and the motor shaft allowing the clutch to operatively couple the motor with the door.

According to another aspect of the present invention, a motor vehicle door assembly comprises a door and a selective power assist device having a manual mode and a power mode. The selective power assist device comprises a motor selectively operatively coupled to the door when in the power mode, a clutch interposed between the motor and the door, a brake assembly, and a controller for controlling the motor, the clutch, and the brake assembly. The controller actuates the brake assembly upon the occurrence of a predetermined door angular velocity or a predetermined door angular position to thereby alternate the selective power assist device between the manual mode, wherein the clutch is actuated to an disengaged position and the motor is operatively decoupled from the door, and the power mode, wherein the clutch is actuated to a engaged position and the motor is coupled from the door.

According to yet another aspect of the present invention, a method of controlling the door swing of a motor vehicle door is disclosed. The method includes comprises the steps of selectively and operatively coupling a door of a motor vehicle to a power assist motor, sensing the angular velocity of the door during a door opening or closing event and the angular velocity of the power assist motor, and providing the angular velocity of the door during a door opening or closing event and the angular velocity of the power assist motor to a controller. A clutch is interposed between a drive shaft and a motor shaft for alternating the motor vehicle door between a power mode, wherein the power assist motor is operatively coupled to the door, and a manual mode, wherein the power assist motor is decoupled from the door, and wherein each of the drive shaft and the motor shaft has an angular velocity. A brake assembly is interposed between the power assist motor and the door, wherein the brake assembly synchronizes the angular velocity of the drive shaft and the motor shaft when in the manual mode to allow the clutch to place the motor vehicle door in the power mode.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
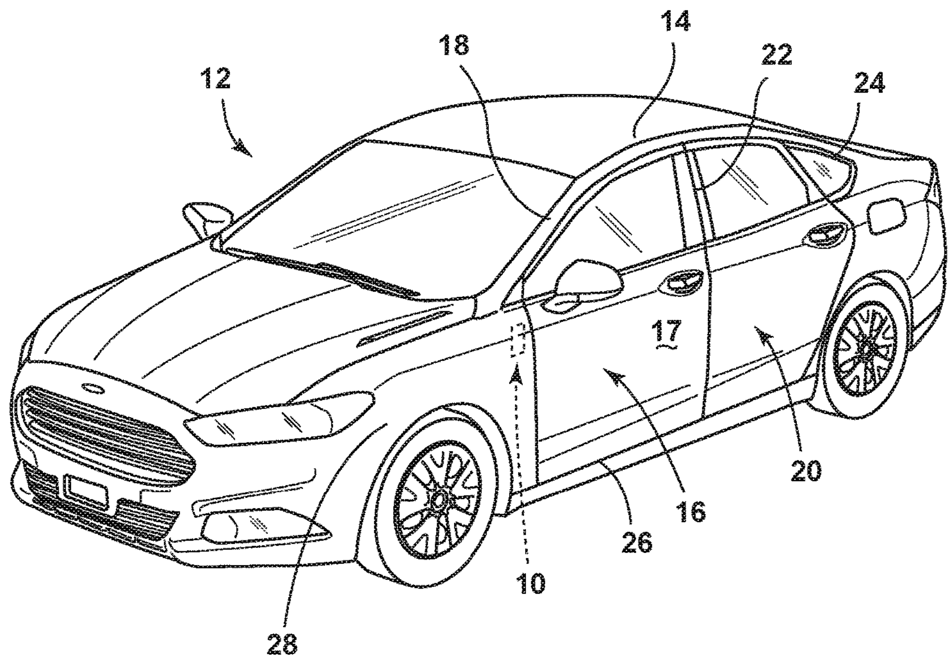
FIG. 1 is a perspective view of a vehicle having a driver's side door in a closed position with a power assist device coupled thereto according to an embodiment.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a power assist device disposed on an exemplary motor vehicle 12. The motor vehicle 12 illustrated in FIG. 1 is an exemplary embodiment of an automotive vehicle or car having a vehicle body 14 upon which a door 16 is pivotally mounted. As shown in FIG. 1, the power assist device 10 is disposed adjacent to the door 16 and is operably and structurally coupled to the door 16 for assisting in moving the door 16 between opened and closed positions, as further described below. Movement of the door 16 is controlled by a controller 110 which is configured to control the power assist device 10. The door 16 illustrated in FIG. 1 is a front side door, specifically a driver's side door; however, any vehicle door is contemplated for use with the power assist device 10 of the present concept. The door 16 is shown hinged to an A-pillar 18 of the vehicle body 14 by means of one or more hinges, as further described below. The door 16 includes an outer panel 17 and is shown in FIG. 1 in a closed position, wherein it is contemplated that the door 16 is latched to a B-pillar 22 of the vehicle body 14. The motor vehicle 12 further includes a rear door 20 which is hingedly coupled to the B-pillar 22 for latching to a C-pillar 24 in assembly. The vehicle body 14 further includes a rocker panel 26 and a front driver's side quarter panel 28, as shown in FIG. 1.

Figure 2:
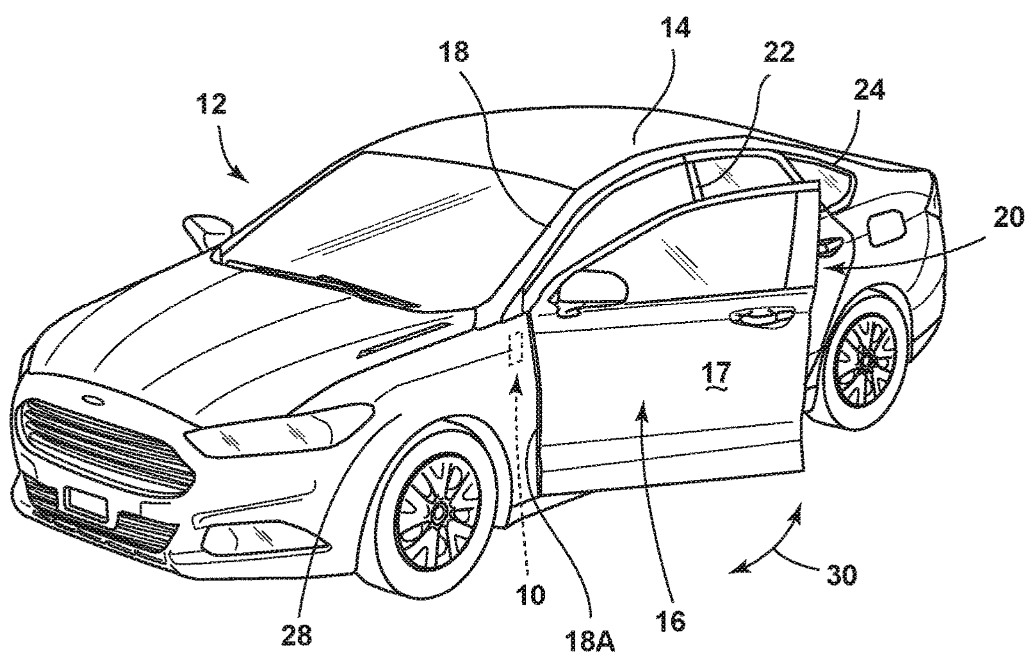
FIG. 2 is a perspective view of the vehicle of FIG. 1 with the driver's side door shown in an open position.

Referring now to FIG. 2, the door 16 is shown in an open position. The door 16 pivots or swings along a door swing path, as indicated by arrow 30, between opened and closed positions as hingedly coupled to a hinge-pillar 18A of the A-pillar 18. Movement of the door 16 between open (FIG. 2) and closed (FIG. 1) positions is contemplated to be optionally powered by the power assist device 10.

Figure 3:
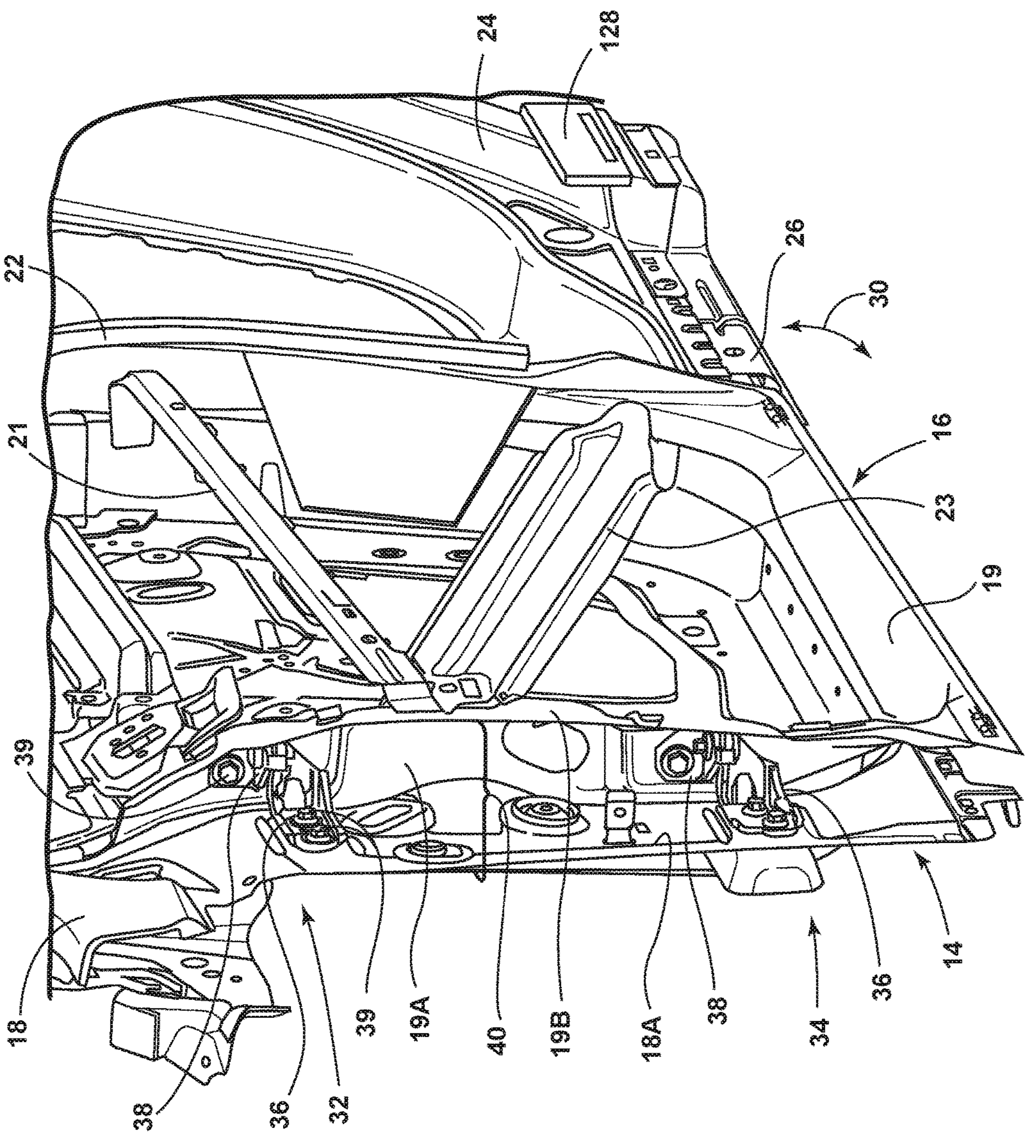
FIG. 3 is a fragmentary perspective view of a vehicle door with an outer panel removed to show a connection between an inner panel of the door and a hinge pillar of the vehicle.

Referring now to FIG. 3, the door 16 is shown in the closed position with the outer panel 17 (FIGS. 1 and 2) removed to reveal upper and lower hinge assemblies 32, 34 coupled to an inner panel 19 of the door 16. The upper and lower hinge assemblies 32, 34 pivotally couple the door 16 to the vehicle body 14 at hinge-pillar 18A and are configured to carry the load of the door 16 as the door 16 moves between the opened and closed positions. A door check strap (not shown) may also be used to help carry the load of the door 16, and is generally positioned between the upper and lower hinge assemblies 32, 34 along the inner door panel 19. The upper and lower hinge assemblies 32, 34 are substantially similar having component parts which will be described herein using the same reference numerals for both the upper and lower hinge assemblies 32, 34. Specifically, the upper hinge assembly 32 is defined by a fixed hinge portion 36 and a moveable hinge portion 38 and coupled via hinge pin 60. The fixed hinge portion 36 and the moveable hinge portion 38 pivotally couple the door 16 to the A-pillar 18. Specifically, the fixed hinge portion 36 is mounted to the A-pillar 18 at hinge-pillar 18A using fasteners 39 or other like coupling means. The moveable hinge portion 38 is rotatably mounted to the fixed hinge portion 36 by a hinge pin (identified and described below) which allows the moveable hinge portion 38 to pivot with respect to the fixed hinge portion 36 as the door 16 opens and closes along the door swing path 30. The moveable hinge portion 38 is fixedly coupled to a sidewall 19A of the inner panel 19 by fastener 39.

As further indicated in FIG. 3 a package compartment 40 is defined by sidewall 19A and sidewall 19B of the inner door panel 19, as well as hinge-pillar 18A. As shown in FIG. 3, sidewall 19A is substantially perpendicular to sidewall 19B, and sidewall 19B is substantially parallel to hinge-pillar 18A. The package compartment 40 is generally closed off by a portion of the front quarter panel 28 (FIGS. 1 and 2) in assembly. As further shown in FIG. 3, the package compartment 40 defines a gap or space for mounting the power assist device 10, as further described below with reference to FIGS. 4A and 5A. As further shown in FIG. 3, the door 16 may also include one or more reinforcement belts 21, 23 for reinforcing the inner panel 19 from torque forces imparted by the power assist device 10 on the door 16.

Figure 4A:
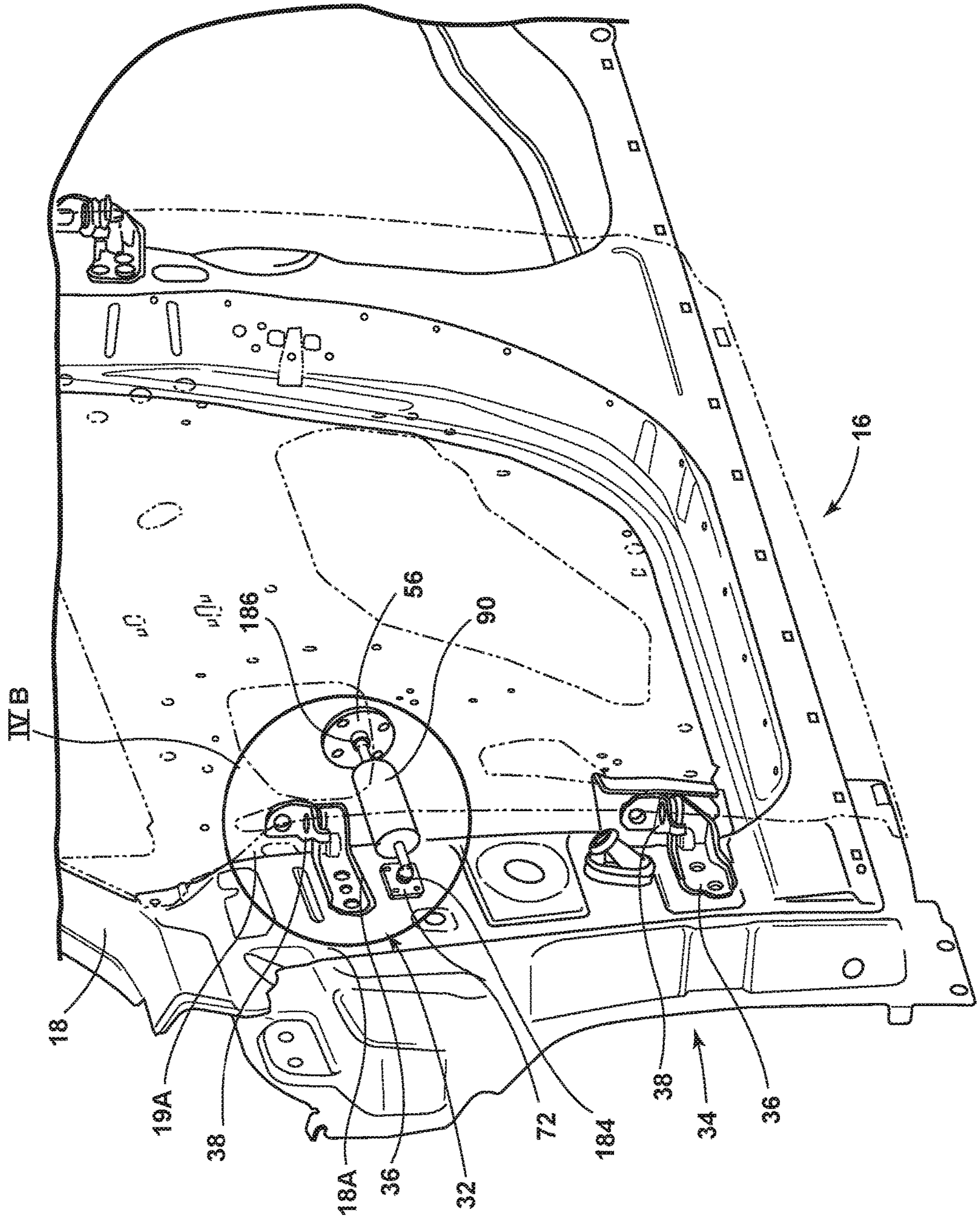
FIG. 4A is a fragmentary perspective view of a vehicle door shown with an inner panel in phantom in a closed position and a first embodiment of a power assist device disposed between the door and the hinge pillar.
Figure 4B:
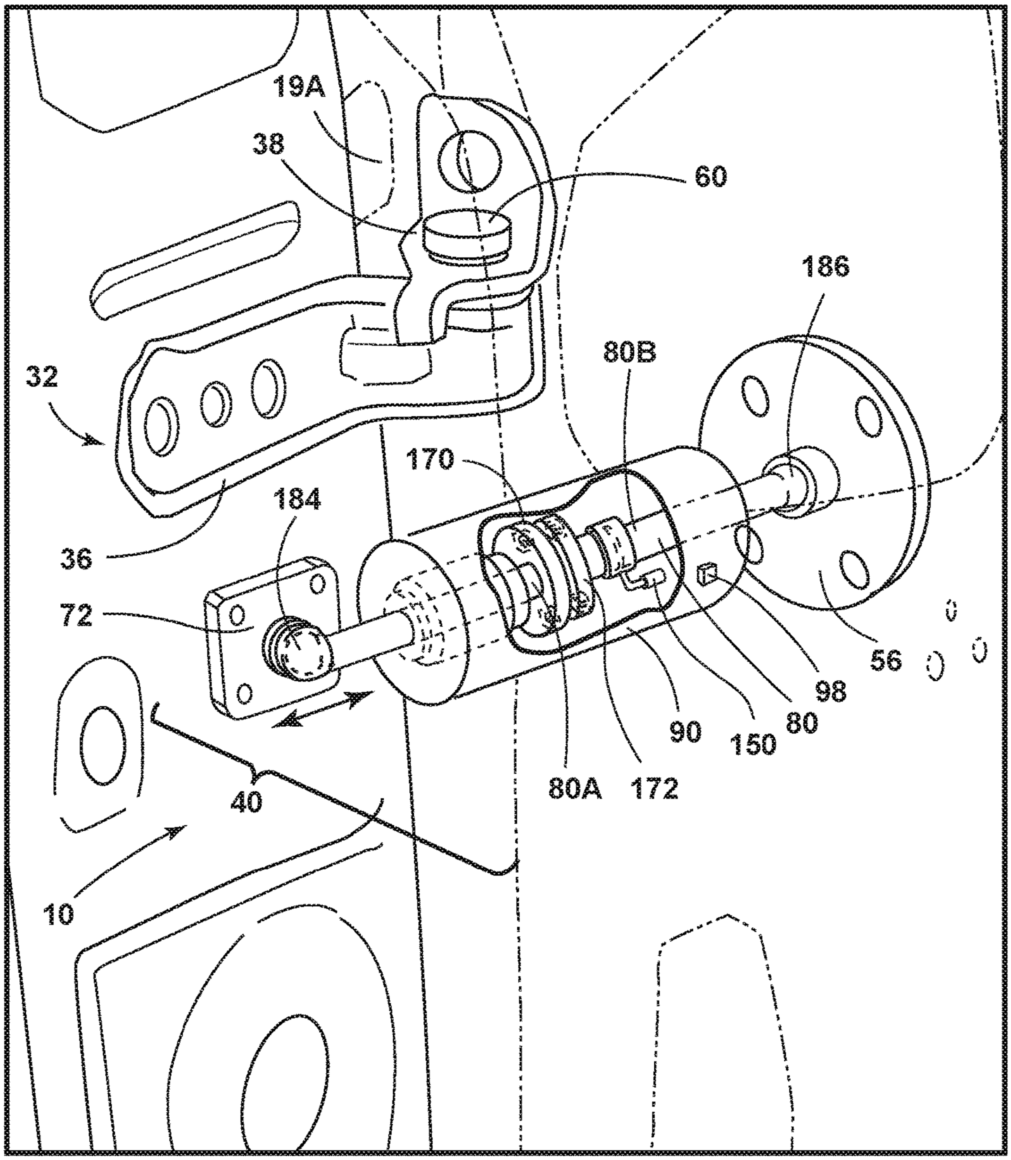
FIG. 4B is a perspective cutaway view of the first embodiment of a power assist device according to a first embodiment of the clutch and braking assembly of the vehicle door of FIG. 4A taken at location IVB.
Figure 4C:
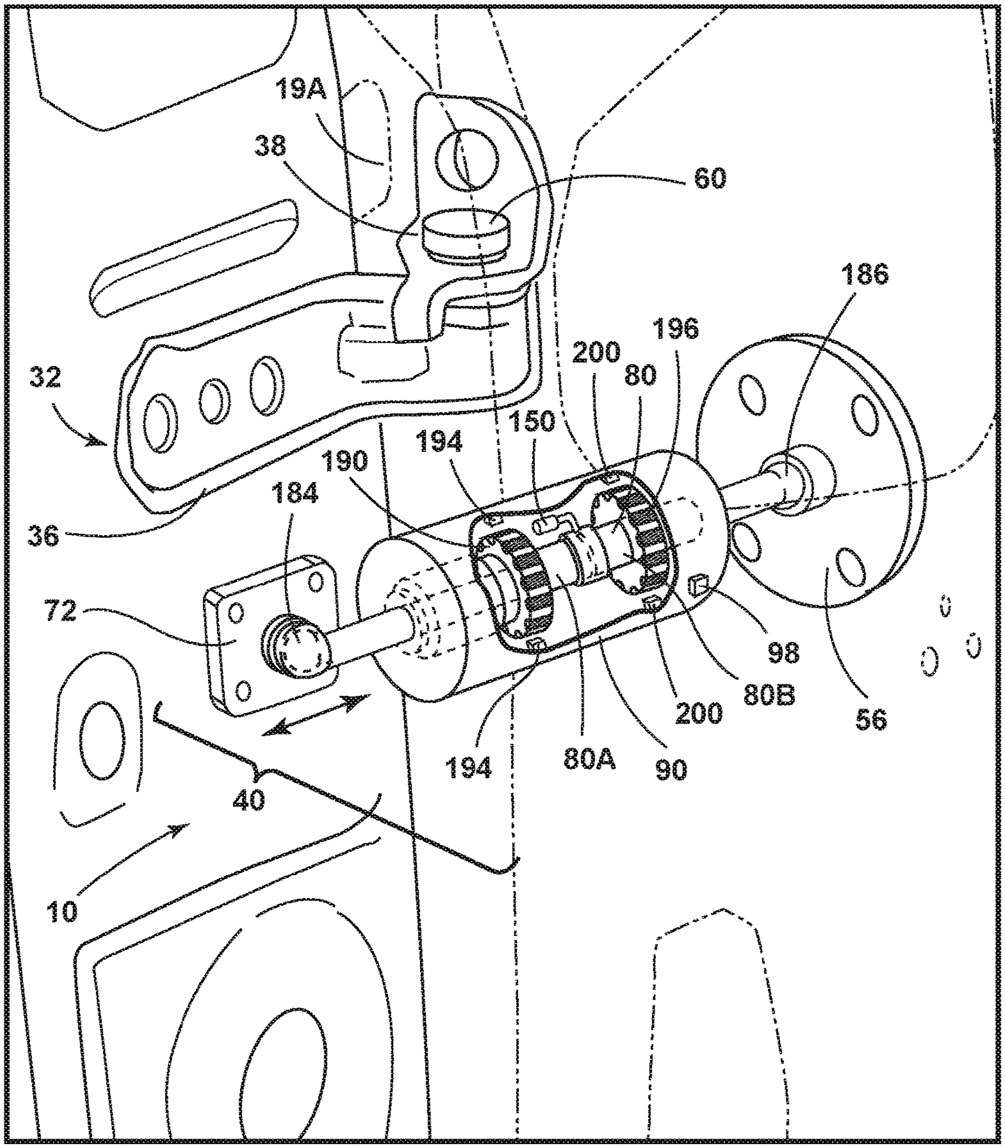
FIG. 4C is a perspective cutaway view of the first embodiment of a power assist device according to a second embodiment of the clutch and braking assembly of the vehicle door of FIG. 4A taken at location IVB.

Referring now to FIG. 4A, a first embodiment of the power assist device 10 is shown disposed in the package compartment 40 between the door 16 and the hinge-pillar 18A. The power assist device 10 shown in FIG. 4A has a generally horizontally disposed cylindrical body portion 90. Having such a configuration, the power assist device 10 can fit into the boundaries of the package compartment 40. The power assist device 10 is disposed on a door mounting bracket 56 which mounts the power assist device 10 to the door 16 (FIG. 4B). Similarly, the power assist device 10 is coupled to a chassis mounting bracket 72 disposed on the hinge pillar 18A. The door mounting bracket 56 and the chassis mounting bracket 72 provide a robust connection between the power assist device 10 and the hinge-pillar 18A for carrying the load of the door 16 as well as carrying the load of any torque imparted by the power assist device 10 when used to assist in opening and closing the door 16. It is contemplated that the door 16, as most conventional vehicle doors, can weigh approximately 90 lbs. or more as an assembled unit. Further information regarding the torque requirements necessary for moving the door 16 as powered from the hinge location by a power assist device are discussed below.

The power assist device 10 is mounted to the door 16 at inner panel 19 via the door mounting bracket 56, which is coupled to sidewall 19A of inner panel 19 such that door mounting bracket 56 rotates with the door 16 between opened and closed positions. In this way, the power assist device 10 is essentially coupled to the door 16 at inner panel 19 and operably coupled to the upper hinge assembly 32 and lower hinge assembly 36 to power or control the opening and closing of the door 16, as further described below.

Figure 6:
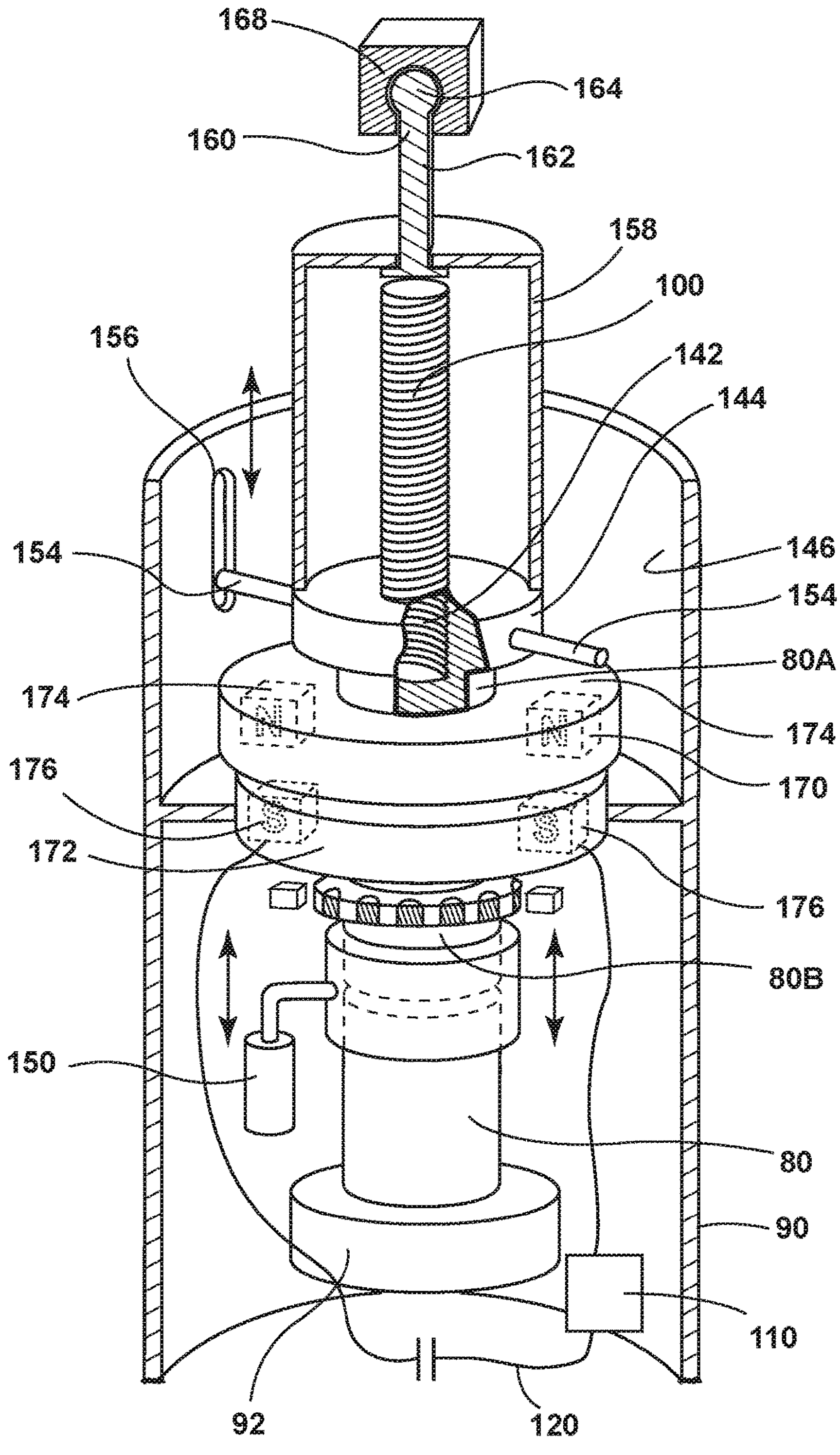
FIG. 6 is a perspective view of the first embodiment of a power assist device and the first embodiment of the clutch and braking assembly of the power assist device.

With further reference to FIGS. 4B and 6, the power assist device 10 is shown having a motor 92 coupled to an output shaft 80 having a distal portion or drive shaft 80A and a proximate portion or motor shaft 80B disposed within the power assist device 10. The motor 92 and the proximate portion or motor shaft 80B of the output shaft 80 are operably coupled to one another in a driven engagement and housed within the cylindrical body portion 90 of the power assist device 10. Thus, the motor 92 is configured to act on the output shaft 80 in a rotating manner.

In the first embodiment of the power assist device 10 shown in FIGS. 4A-E and 6, the distal portion or drive shaft 80A of the output shaft 80 is operably coupled to a threaded shaft 100. The threaded shaft 100 is, in turn, received within a threaded opening 142 within a rotationally fixed drive nut 144. The drive nut 144 is, however, adapted for linear movement along the axis of the cylindrical body portion 90 of the power assist device 10 and has guides 154 that slide within a slot 156 on an inner wall 146 of the cylindrical body portion 90 of the power assist device 10. The drive nut 144 is further operably coupled via a drive cylinder 158 to an exteriorly extending shaft 162, which is provided with a ball-shaped coupling device 164 on a distal end 166 thereof. The chassis mounting bracket 72 mounted to the hinge pillar 18A is, in turn, provided with a socket coupling device 168. Preferably, the socket coupling device 168 of the chassis mounting bracket 72 fittingly receives the ball-shaped coupling device 164 of the exteriorly extending shaft 162 to form a ball-and-socket coupling 184 to allow the exteriorly extending shaft 162 to function as described below. A similar ball-and-socket coupling 186 is provided opposite the ball-and-socket coupling 184 to couple the power assist device 10 to the door 16.

As the output shaft 80 is driven by the motor 92 and drives the threaded shaft 100, the rotation of the threaded shaft 100 engages the threaded opening 102 in the drive nut 144 and moves the drive nut 144 axially within the cylindrical body portion 90 of the power assist device 10. The drive nut 144 of the power assist device 10 in turn displaces the drive cylinder 158 inwardly and outwardly, along with the exteriorly extending shaft 162. With the power assist device 10 coupled between the inner panel 19 via chassis mounted bracket 72 and the door mounting bracket 56, the rotating motion of the motor 92 of the power assist device 10 creates a pivoting motion of the door 16 between opened and closed positions. As further shown in FIG. 4B, the power assist device 10 has an electrical connector 98 disposed thereon for receiving signal information from the controller 110 (FIG. 10) for translating user commands into power assisted door functionality.

Figure 4D:
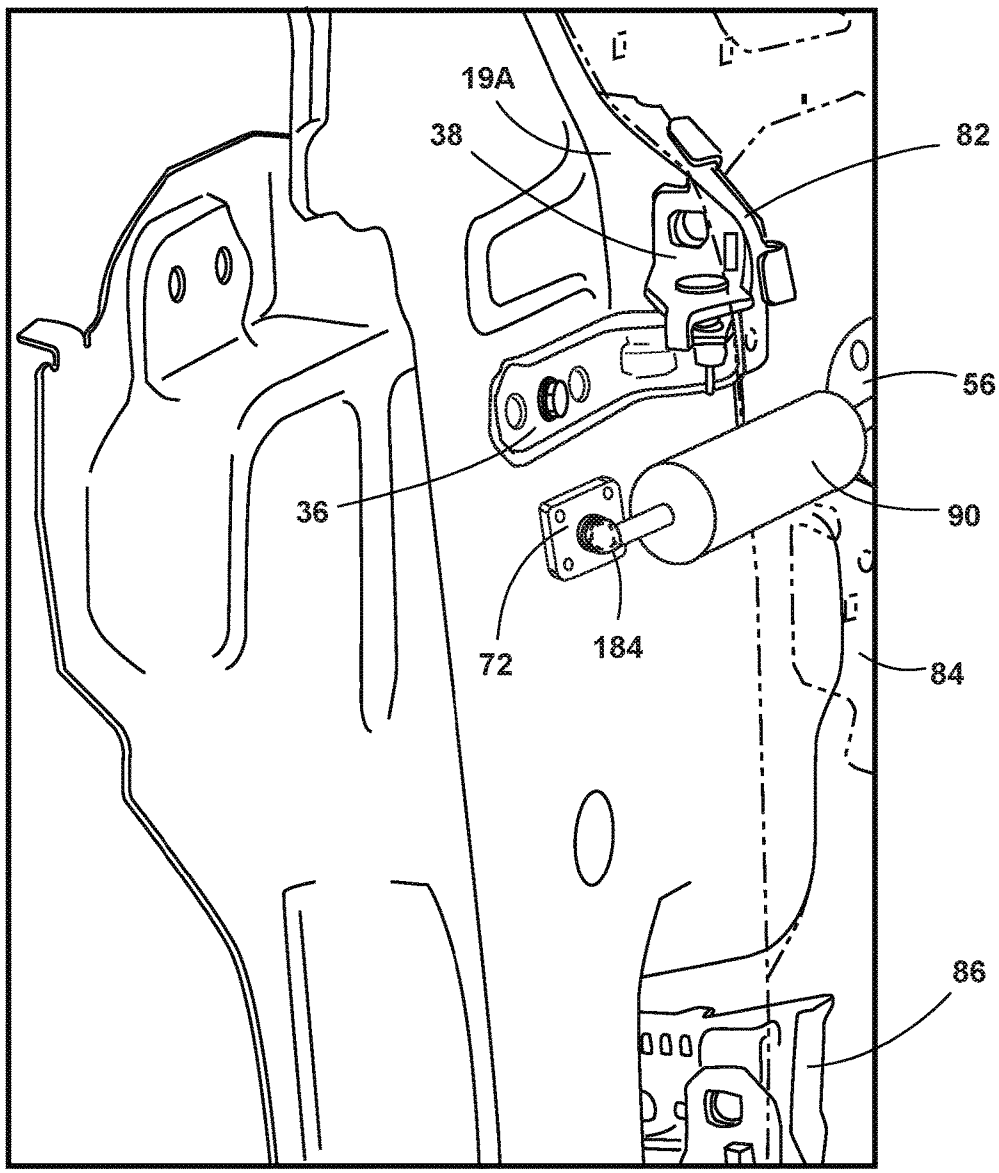
FIG. 4D is a perspective view of the vehicle door of FIG. 4A.
Figure 4E:
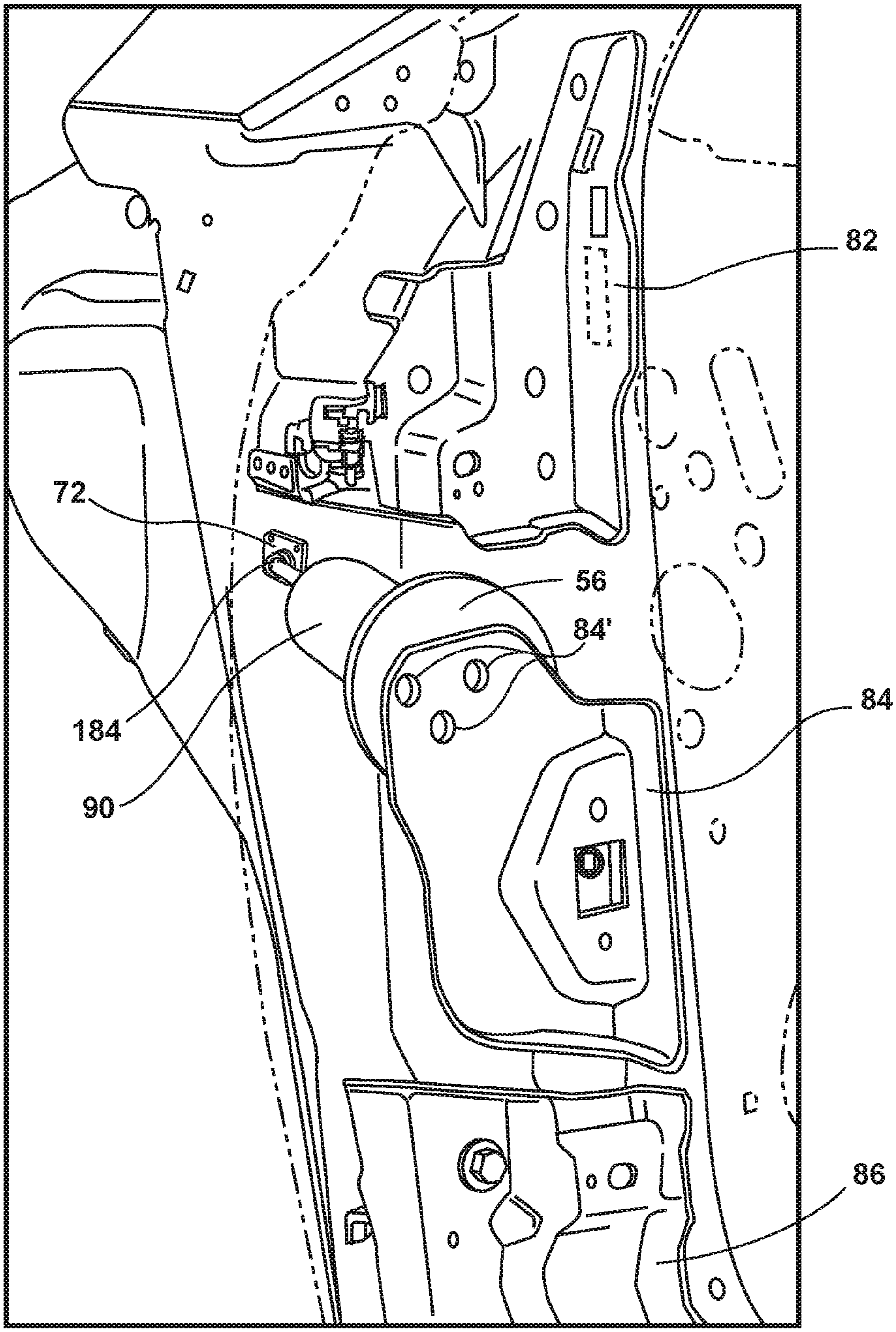
FIG. 4E is a rear perspective view of the vehicle door of FIG. 4A.

As further shown in FIGS. 4D and 4E, an upper door side bracket 82 and a lower door side bracket 86 are also disposed on an opposite side of sidewall 19A relative to the power assist device 10. A middle power assist bracket 84 together with the brackets 82, 86 act as doubler plates, providing reinforcement for the power assist device 10. In this way, the inner panel 19 of the present concept is reinforced at the connection of the inner panel 19 with the hinge-pillar 18A through the chassis mounted bracket 72 of the power assist device 10 by the brackets 82, 84, 86. The door 16 can also be further reinforced against torque from the power assist device 10 by coupling one or more reinforcement belts 21, 23 (FIG. 3) of the door 16.

Figure 5A:
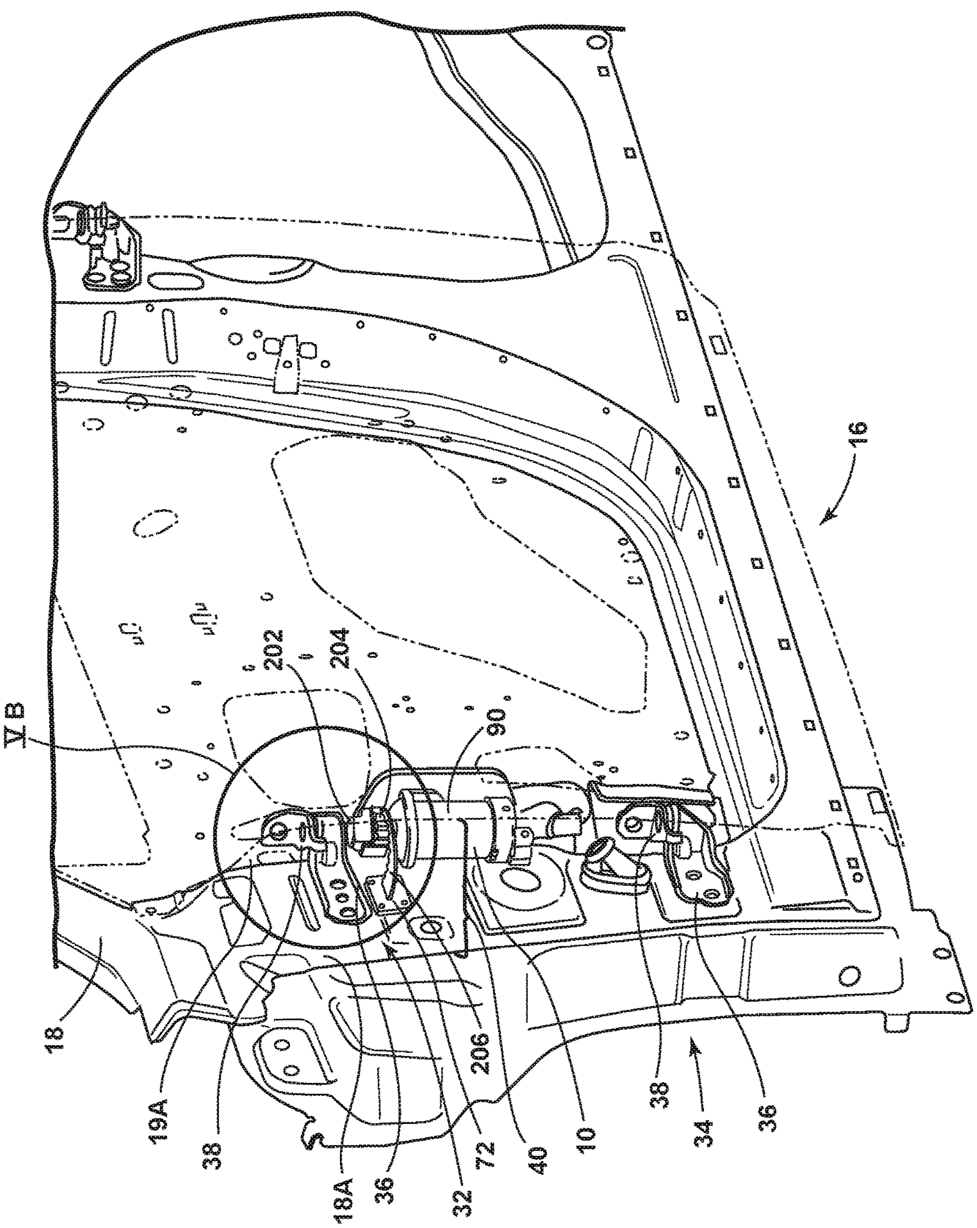
FIG. 5A is a fragmentary perspective view of a vehicle door shown with an inner panel in phantom in a closed position and a second embodiment of a power assist device disposed between the door and the hinge pillar.

Referring now to FIG. 5A, a second embodiment of the power assist device 10 is shown disposed in the package compartment 40 between the door 16 and the hinge-pillar 18A. The power assist device 10 shown in FIG. 5A has a generally vertically disposed cylindrical body portion 90. Having such a configuration, the power assist device 10 can likewise fit into the boundaries of the package compartment 40. As in the first embodiment of the power assist device 10, the second embodiment of the power assist device 10 is disposed on a door mounting bracket 56 which mounts the power assist device 10 to the door 16 (FIG. 4B). Similarly, the power assist device 10 is coupled to a chassis mounting bracket 72 disposed on the hinge pillar 18A. The door mounting bracket 56 and the chassis mounting bracket 72 operably couple the power assist device 10 to the hinge-pillar 18A for carrying the load of the door 16, as well as carrying the load of any torque imparted by the power assist device 10 when used to assist in opening and closing the door 16.

The second embodiment of the power assist device 10 is mounted to the door 16 at inner panel 19 via the door mounting bracket 56, which is coupled to sidewall 19A of inner panel 19, such that door mounting bracket 56 rotates with the door 16 between opened and closed positions. In this way, the power assist device 10 is operably coupled to the upper hinge assembly 32 and lower hinge assembly 36 to power or control the opening and closing of the door 16, as further described below.

Figure 5B:
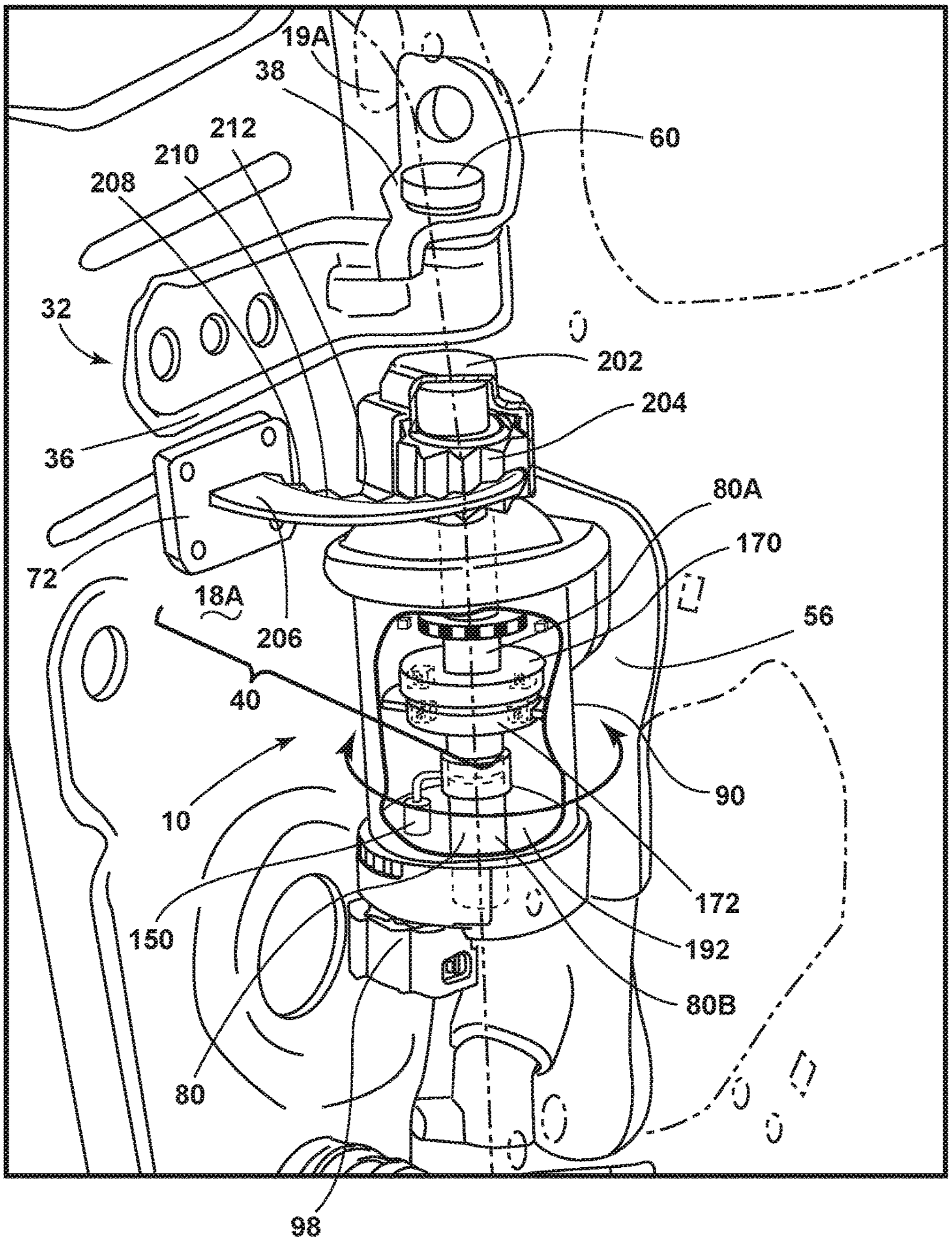
FIG. 5B is a perspective cutaway view of the second embodiment of a power assist device according to the first embodiment of the clutch and braking assembly of the vehicle door of FIG. 5A taken at location VB.
Figure 7:
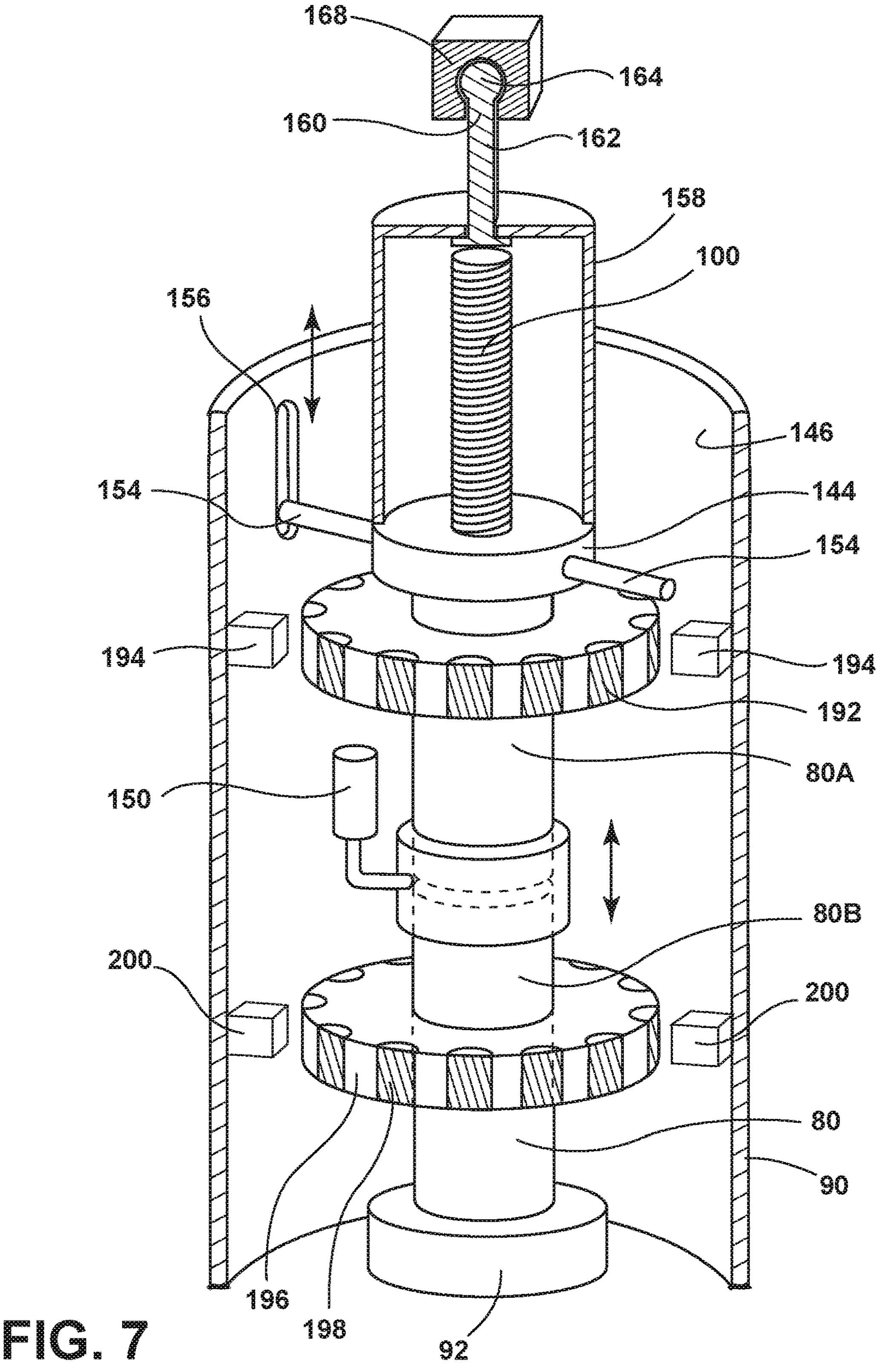
FIG. 7 is a perspective view of the first embodiment of a power assist device and second embodiment of the clutch and braking assembly of the power assist device.

With further reference to FIGS. 5B and 7, the power assist device 10 is shown having a motor 92 coupled to an output shaft 80 having a distal portion or drive shaft 80A received within a check strap housing 202 and a proximate portion or motor shaft 80B disposed within the power assist device 10. The motor 92 and the proximate portion or motor shaft 80B of the output shaft 80 are operably coupled to one another in a driven engagement and housed within the cylindrical body portion 90 of the power assist device 10.

Figure 5C:
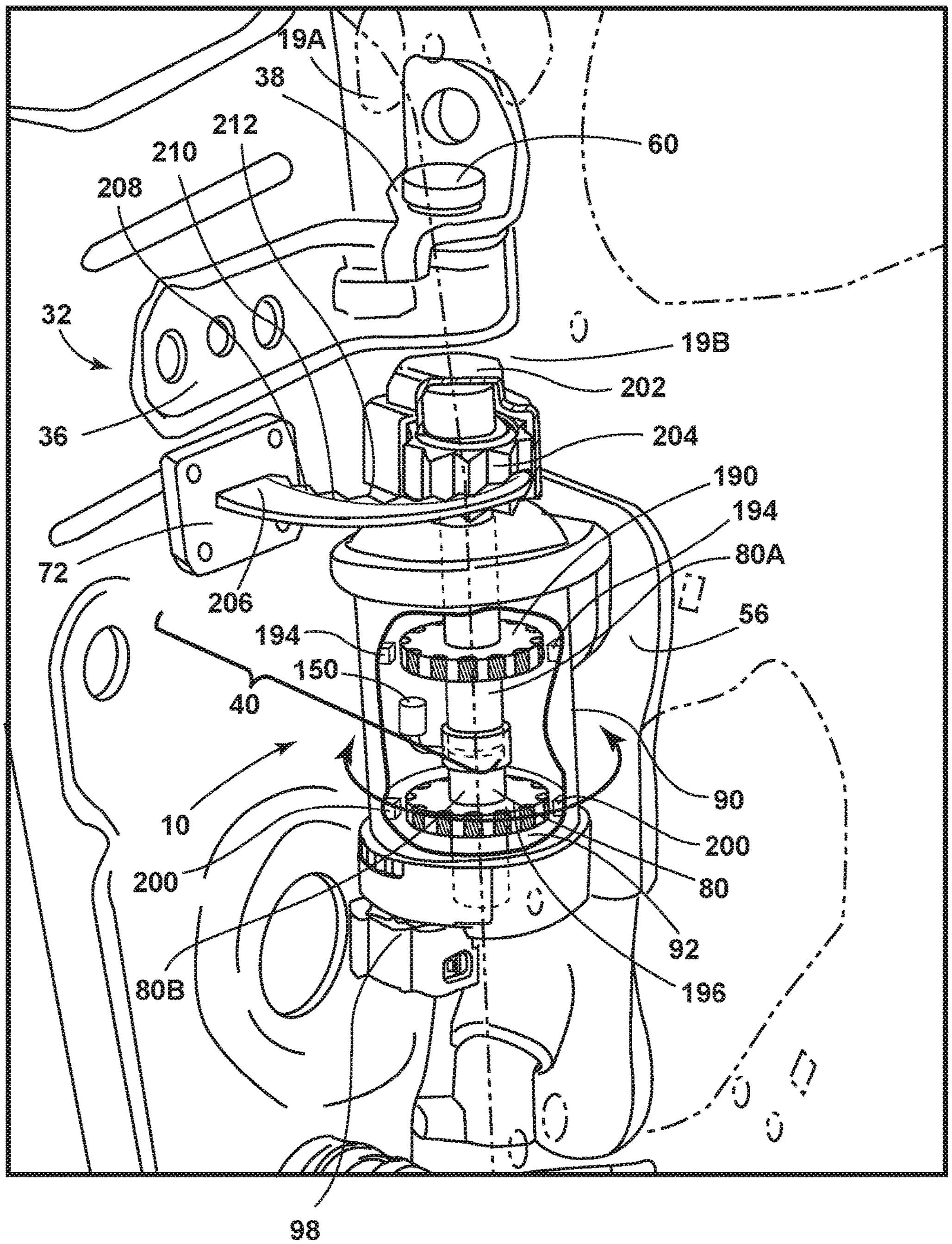
FIG. 5C is a perspective cutaway view of the second embodiment of a power assist device according to the second embodiment of the clutch and braking assembly of the vehicle door of FIG. 5A taken at location VB.
Figure 5D:
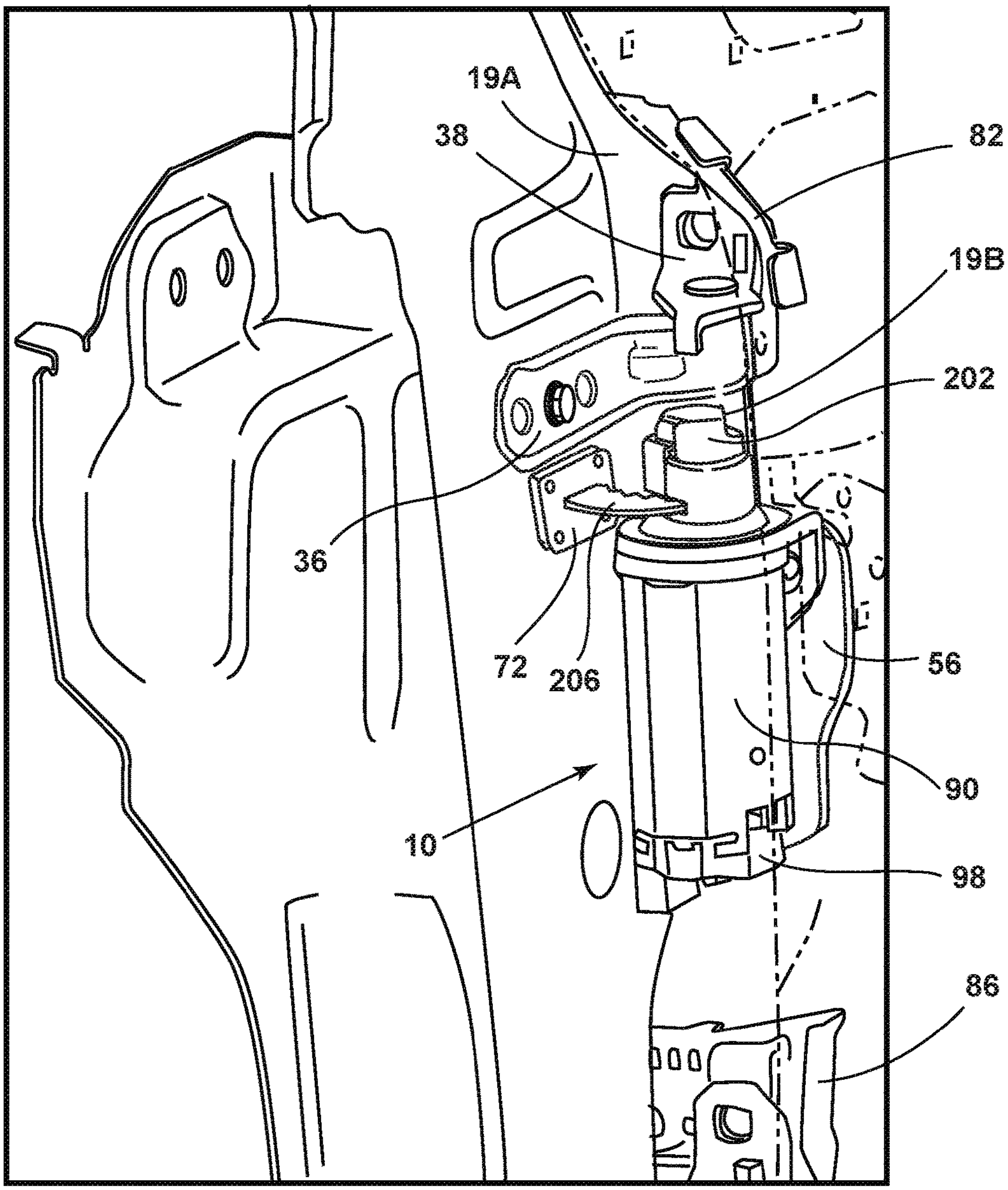
FIG. 5D is a perspective view of the vehicle door of FIG. 5A.
Figure 5E:
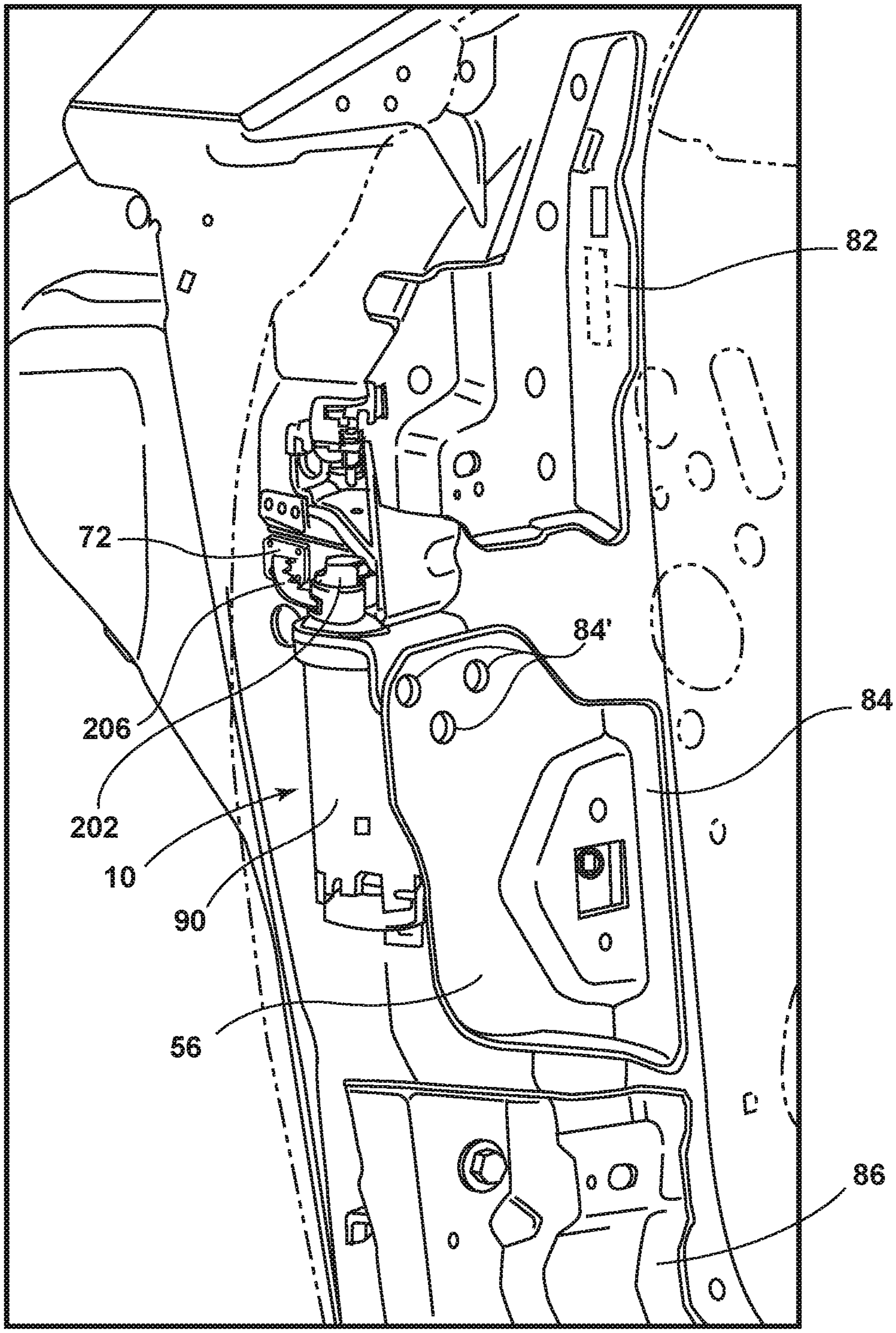
FIG. 5E is a rear perspective view of the vehicle door of FIG. 5A.

In the second embodiment of the power assist device 10 shown in FIGS. 5A-E, the distal portion or drive shaft 80A of the output shaft 80 is operably coupled to a driven gear 204 disposed at the distal end or drive shaft 80A of the output shaft 80. The driven gear 204 is, in turn, operably coupled with a retractable check strap arm 206 attached to the chassis mounted bracket 72 extending through the check strap housing 202. In particular, the retractable check strap arm 206 is preferably configured as a curved structure provided with a rack gear 208 situated on an interior curved edge 210 thereon. As shown in FIGS. 5A-5C, the gear teeth 212 of the driven gear 204 engage the rack gear 208 of the retractable check strap arm 206 to drive the retractable check strap arm 206 inwardly and outwardly relative the check strap housing 202.

As the output shaft 80 is driven by the motor 92 and drives the driven gear 204, the rotation of the driven gear teeth 212 engaged with the rack gear 208 on the retractable check strap arm 206 moves the retractable check strap arm 206 inwardly and outwardly relative the check strap housing 202. With the power assist device 10 coupled between the inner panel 19 via chassis mounting bracket 72 and the door mounting bracket 56, the retractable check strap arm 206 of the power assist device 10 creates a pivoting motion of the door 16 between opened and closed positions. As further shown in FIG. 5B, the second embodiment of the power assist device 10 likewise has an electrical connector 98 disposed thereon for receiving signal information from the controller 110 (FIGS. 1 and 10) for translating user commands into power-assisted door functionality. Also, as in the first embodiment, brackets 82, 84, 86 can be provided to act as doubler plates, providing reinforcement for the power assist device 10 and hinges 32, 36. The door 16 can also be further reinforced against torque from the power assist device 10 by coupling one or more reinforcement belts 21, 23 (FIG. 3) of the door 16.

Figure 8:
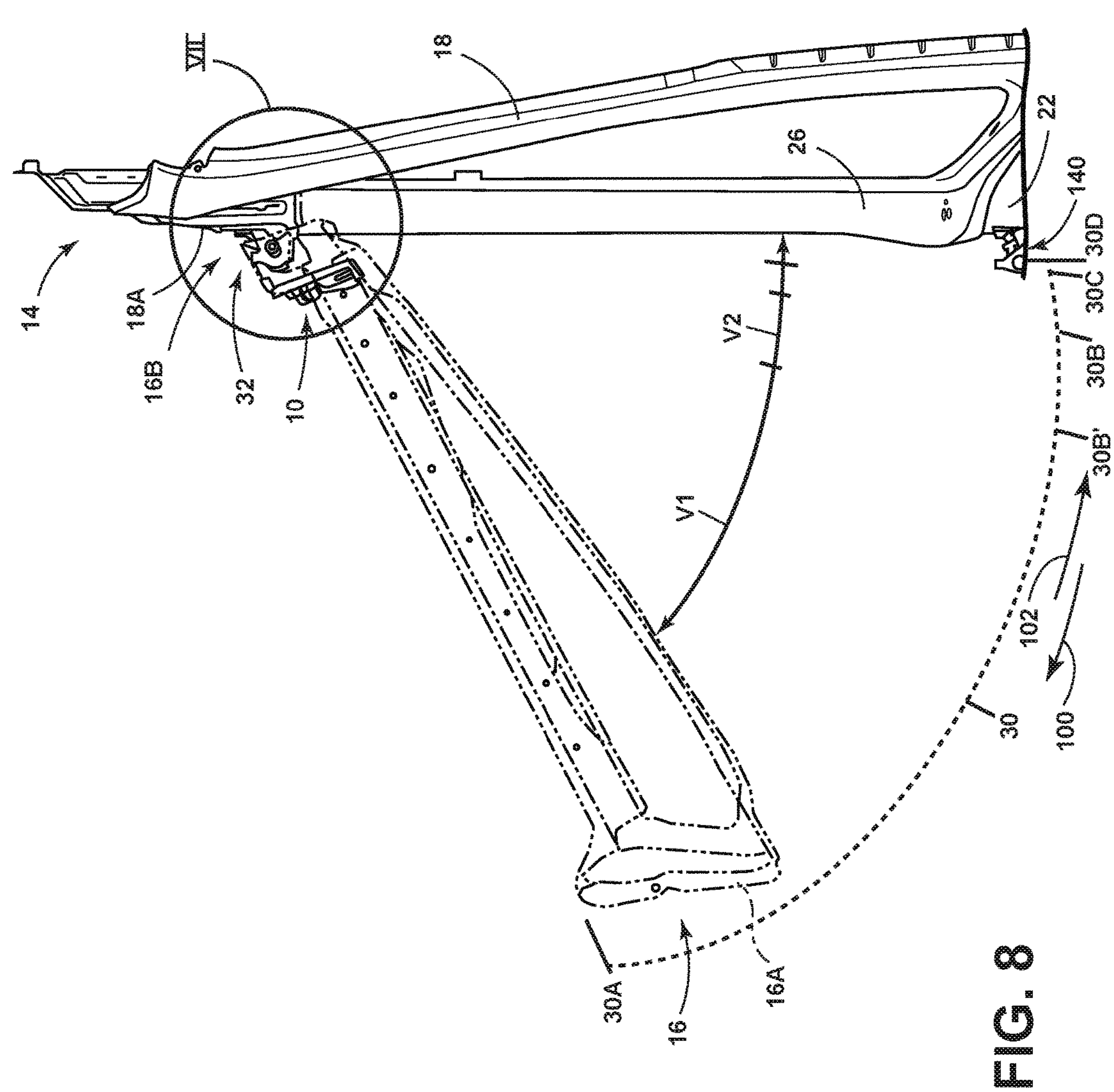
FIG. 8 is a top plan view of a vehicle door showing relative movement of the door between opened and closed positions along a door swing path.
Figure 9:
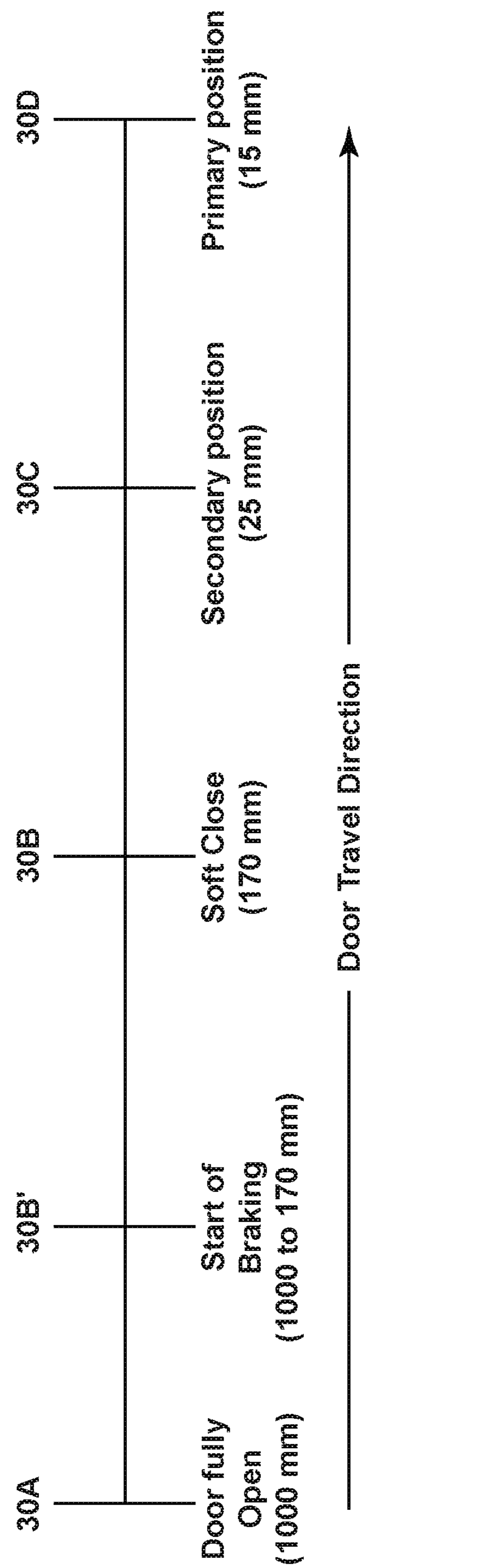
FIG. 9 is a schematic diagram showing a vehicle door assembly closing sequence according to one embodiment.

One aspect of the present disclosure is to provide a soft close experience to a user when closing a vehicle door 16 via the power assist device 10. With reference now to FIG. 8, the door 16 is shown in an opened position relative to the vehicle body 14. The door swing path 30 is shown having various door positions identified thereon. Specifically, reference point 30A indicates a fully opened door position, which is approximately 1000 mm away from a flush and closed position along the curved door swing path 30. The flush and closed position is identified in FIG. 8 as reference point 30C. During a door closing operation, reference point 30B indicates an approximate door position, where a soft close feature is initiated by the power assist device 10 to prevent a user from slamming the door 16 to the closed position 30C. That is, upon reaching the reference point 30B, a cinch motor 128 mounted on a rear portion of the door 16 (see FIG. 3) engages the B pillar and draws the door 16 toward the flushed and closed position identified as 30C. The reference point 30B', designating the range of locations between the reference point 30A and the reference point 30B, discloses where the door 16 may be subjected to the braking assembly 160, described more fully below, to prevent the door 16 from slamming (in the case of the door 16 being closed) or to prevent the door 16 from abruptly opening due to an inclined angle of the vehicle 12 or a sudden gust of wind (in the case of the door 16 being opened).

Reference point 30D indicates an over-closed door position that is generally required in order to get a latch mechanism 140, disposed on the door 16, to latch the door 16 in the closed position 30C. In normal operation, once latched by movement to the over-closed position 30D, the door 16 may slightly revert towards reference point 30C, which indicates a door position that is essentially closed and flush with the vehicle body 14. In a normal door closing procedure, the door 16 is in a closing motion from reference point 30A, and the first time the door 16 reaches the position of reference point 30C, the door 16 will be flush with the vehicle body 14 but unlatched. In a normal door closing procedure, the door 16 must move from reference point 30C to the over-closed position at reference point 30D so that the door 16 will latch to the vehicle body 14. Then, the door 16 may slightly rebound toward the latched and flush position at reference point 30C. The present concept contemplates a sequence of door positions and latch configurations that can avoid the need to move the door 16 to the over-closed position 30D, while still getting the door 16 to latch to the vehicle body 14.

The door swing path 30 shown in FIG. 8 represents a swing path taken from the point of the door edge 16A. The hinge axis or hinge point for the door 16 is represented by reference numeral 16B. It is the hinge axis 16B from which the power assist device 10 controls the movement of the door 16, as described above. With reference to Table 1 below, the angle of the vehicle door 16 is shown along with the distance of the door edge 16A to the closed position 30C in millimeters. The torque required by the power assist device 10 is shown in Table 1 in order to close the vehicle door 16 from the various opened door positions, identified on swing path 30 in FIG. 6. The torque required to close the door 16 is shown in Table 1 as “with” and “without” inertia. For the purposes of this disclosure the term “with inertia” implies that the door 16 is shut from a distance sufficient to generate inertia in the door movement, such that less torque is required from the power assist device 10. Further, inertia can be generated by an initial closing motion manually imparted on the door 16 by a user. Inertia is equal to the mass of the door 16 (about 60-90 lbs or 30-40 kg) times the rotational velocity (V1 in FIG. 8). When a user attempts to slam the door 16 along the door swing path 30, the power assist device 10 is configured to slow the door movement or rotational velocity V1 to velocity V2 to provide a slow closing motion. With regard to a user slamming the door 16, a 10 N/m acceleration applied continuously to a door for 60° rotation of the door is a very dramatic door slam with a terminal velocity of approximately 15 rpm or 90°/sec. For purposes of this disclosure any velocity of 5 rpm (30°/sec)-15 rpm (90°/sec) is considered slamming the door 16. In a normal closing motion, a user will generally give a door a minimum of 0.33 rpm or 2°/sec at least at the last 5° of the closing motion to sufficiently close the door.

TABLE 1

| Door Position | Door edge Distance to latch (mm) | Angle from vehicle body | Torque to close with inertia (N/m) | Torque to close without inertia (N/m) |
|---|---|---|---|---|
| 30A | 1000 mm | 60+ deg | <10 N/m | 40 N/m |
| 30B | 170 mm | 20 deg | 40 N/m | 40 N/m |
| 30B-2 | 70 mm | 8 deg | 40 N/m | 100 N/m |
| 30C | 25 mm | 1.6 deg | 80 N/m | 300 N/m |
| 30D | 15 mm | 1 deg | 200 N/m | 610 N/m |

Consistent with Table 1 above, movement of the door 16 from position 30A to position 30B is approximately 825 mm and identifies a portion of the swing path 30 between position 30A and 30B that could be a slamming motion initiated by a user. As a user manually initiates a door slamming motion, the door 16 will move along the door swing path 30 at an initial velocity V1 (approximately 5-15 rpm) until the door 16 reaches position 30B. At approximately position 30B, the door 16 will slow to a velocity V2 (approximately 0.33 rpm) by a resistance force imparted by the power assist device 10 on the upper hinge assembly 32 to slow the door movement between positions 30B and 30C from velocity V1 to velocity V2. It is contemplated that the torque required by the power assist device 10 to slow the door 16 to a slow and gentle close of 0.33 rpm along the door swing path 30 is approximately 200 N/m. The amount of time required for slowing the movement of the door 16 from velocity V1 to velocity V2 between door positions 30B to 30C is approximately 200-300 milliseconds. It is contemplated that the power assist device 10 will operate in this manner to absorb the energy from the slamming door motion along swing path 30 while the vehicle is in a key-off operation. Driving operation is not required for the slow close functionality. In this way, the power assist device 10 provides a gentle close or slow close for the door 16, even when a user attempts to slam the door 16 shut.

With further reference to FIG. 8, a door opening direction is indicated by reference numeral 100. The door 16 of the present concept is contemplated to be in communication with a variety of sensors which are configured to detect an object positioned in the door swing path 30, such that the power assist device 10 of the present concept can slow or stop the door 16 to prevent the door 16 from opening into an object positioned along the door's swing path 30, when such an object is detected. The torque required to slow or stop the door 16 during the opening movement (swing path 30) is contemplated to be approximately 200 N/m and is further contemplated to take approximately 200-300 milliseconds during a user-initiated door opening sequence. Further, the power assist device 10 of the present concept provides the door 16 with an infinite number of detents (door checks) along the swing path 30. The position of the detents or door checks may be customized by the user and programmed into the controller 110 (FIG. 10), which is in communication with the power assist device 10, for controlling movement of the same. The door checks are contemplated for use with an automatic door opening sequence powered by the power assist device 10 in the direction as indicated by arrow 100. The torque required to stop the door 16 during an automatic door opening sequence powered by the power assist device 10 at a predetermined door check position is approximately 10-50 N/m and may take up to 60 seconds. In this way, the power assist device 10 can be preprogrammed by a user to open the door 16 to a desired door check position along the door swing path 30 and hold the door 16 at the selected door check position for the user to enter or exit the motor vehicle 12 without worry of the door 16 opening any further or possibly into an adjacent obstruction. In this way, the power assist device 10 of the present concept provides infinite door check along the swing path 30 of the door 16. Pre-set door check positions may be preprogrammed into the controller 110 (FIG. 10), and user-selected/customized door checks may also be programmed into the controller 110.

Preferably, door opening and closing efforts can be reduced when the vehicle is parked on a hill or slope. The power assist device 10 is contemplated to be provided with signal information from the controller 110 to provide assistance in opening the door 16 in a slow and consistent manner when a vehicle position is declined, such that the door opening motion would generally be increased due to an downward angle of the motor vehicle 12 from the back to the front of the motor vehicle 12. As a corollary, the power assist device 10 can provide door closing assistance to aid in closing a door 16 that is positioned at a downward angle, so that both the door opening and door closing efforts are consistent. Similarly, when the motor vehicle 12 is parked on an inclined or up-hill slope, the power assist device 10 is configured to provide a reduced closing velocity of the door 16 in the closing direction based on signal information received from the controller 110 to the power assist device 10. The power assist device 10 can also provide door opening assistance to aid in opening a door 16 that is positioned at an upward angle, for consistency. It is contemplated that such power assistance would require up to 200 N/m of torque for approximately 10-20 seconds. In this way, the power assist device 10 of the present concept is able to provide consistent door opening and closing efforts, such that the user is provided a consistent door opening and closing experience regardless of the inclined, declined or substantially horizontal position of the vehicle.

It should be noted that the power assist device 10 may be configured according to any of the embodiments described herein. The motor 92 is contemplated to be an electric motor, power winch, actuator, servo motor, electric solenoid, pneumatic cylinder, hydraulic cylinder, or other like mechanism having sufficient power necessary to provide the torque required to move the door 16 between opened and closed positions, as well as various detent locations, as powered from the hinge point of the door 16. According to a preferred embodiment, the motor 92 may be a brushless or brushed direct-current motor and includes a field component 106 for generating a magnetic field and an armature 108 having an input current that interacts with the magnetic field to produce torque. Alternatively, it is contemplated that the motor 92 may be a switched reluctance motor. As already described herein, the motor 92 may act on the output shaft 80 (e.g., FIG. 4B) in a rotating manner, and the torque generated by the motor 92 may be used to assist a user in moving the door 16 between opened and closed positions, as well as various detent locations. Additionally, in some embodiments, the motor 92 may be configured to apply a mechanical resistance to the door 16 to resist door swing.

The motor 92 is controlled by the controller 110 that may supply signals 112 to the motor 92 through an electrical connector 98 (e.g., FIGS. 4B and 5B) to achieve a variety of motor actions. The controller 110 may include a processor 114 and a memory 116 having instructions 118 stored thereon that serve to effectuate the power assist functionality described herein. The controller 110 may be a dedicated controller or one belonging to another vehicle system. While not shown, it should be appreciated that the controller 110 may be interfaced with additional power assist devices that are operatively coupled with other doors of the motor vehicle 12. The controller 110 may be electrically coupled to a power source 120 for controlling power delivery to the motor 92. The power source 120 may be a vehicle power source or an independent power source.

Figure 10:
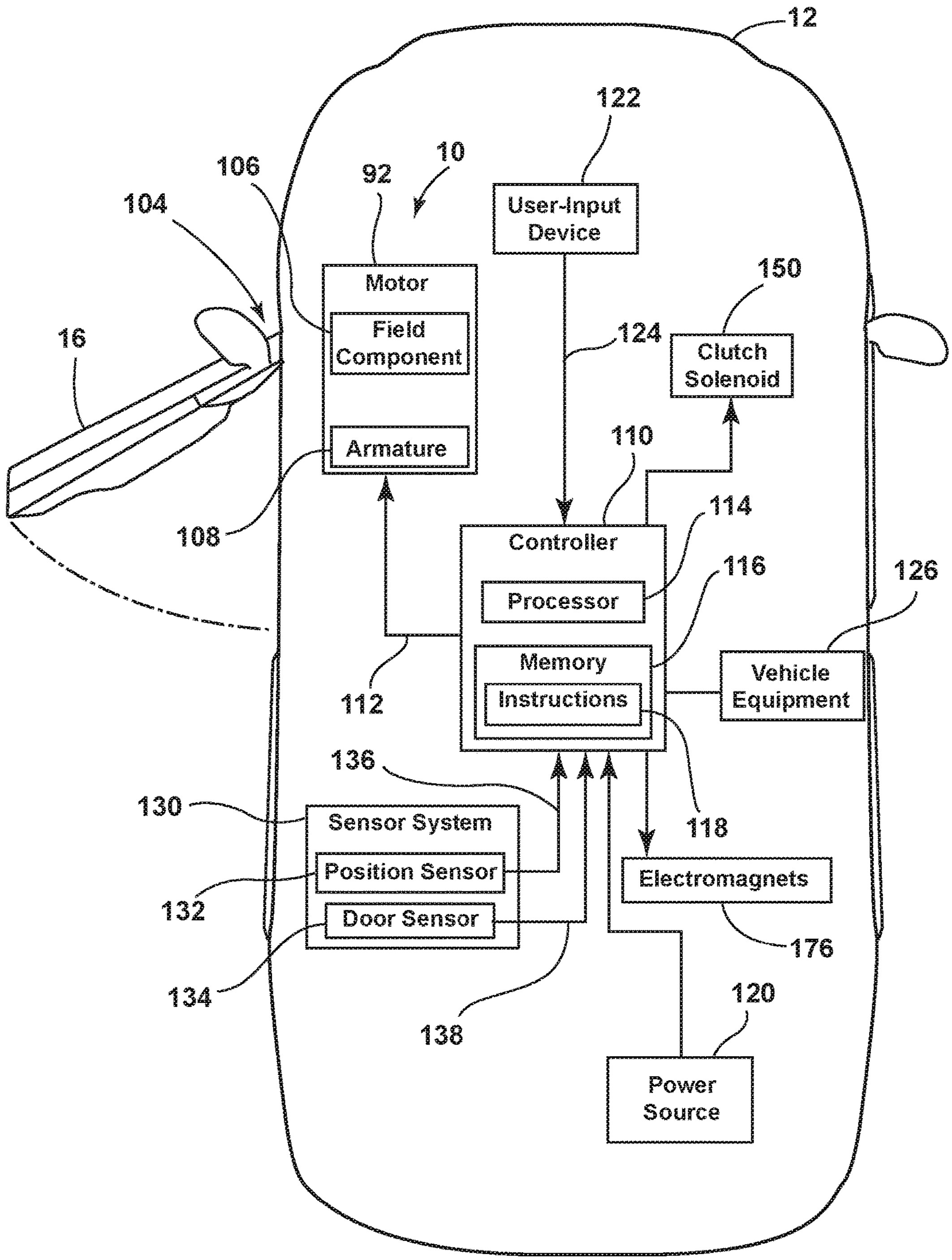
FIG. 10 is a schematic diagram showing a vehicle door assembly according to one embodiment.

With continued reference to FIG. 10, the controller 110 is communicatively coupled to a user-input device 122 for supplying to the controller 110 one or more user-inputted selections 124 for controlling door swing. It is contemplated that the user-input device 122 may be an onboard device or a portable electronic device configured to wirelessly communicate with the controller 110, such as a smartphone and the like. User-inputted selections may be inputted via the user-input device 122 in a variety of manners. For example, it is contemplated that the user-input device 122 may include a touch screen to allow a user to make his or her selections through one or more touch events. Additionally or alternatively, a user may make his or her selections through the manipulation of buttons, sliders, knobs, etc. Additionally, or alternatively still, it is contemplated that a user may make his or her selections through voice commands. In any event, by providing a user with the ability to make selections to dictate how the motor 92 behaves, the manner in which the door 16 swings during a door opening or door closing event becomes customizable to suit the needs of the user, which may vary based on age, size, strength, operational environment, etc.

According to one embodiment, a user may make one or more user-inputted selections for specifying a torque applied by the motor 92 to the door 16 to assist the user with opening or closing the door 16. The torque applied by the motor 92 to the door 16 may be a function of an angular position of the door 16. By way of example, the swing path 30, shown in FIG. 6, may be displayed to a user so that he or she may make one or more selections specifying a torque to be applied by the motor 92 to the door 16 at one or more angular positions of the door 16, wherein each angular position of the door 16 corresponds to a position on the swing path 30. The angular position(s) may correspond to distinct door positions and/or a range of positions, as specified by the user. For example, a user may specify a torque to be applied by the motor 92 to the door 16 at positions 30A, 30B, 30B', 30C, and 30D, respectively. Along with specifying an amount of torque, the user may also specify a direction in which the torque is applied, thus allowing the user to control torque while the door 16 is being moved opened or closed. Furthermore, it is contemplated that the user may make torque selections based on an operating condition of the motor vehicle 12. For example, different torque selections can be implemented based on whether the vehicle ignition is turned ON or OFF. Finally, as further discussed below, the user may opt to disable the power assist device 10 and manually operate the door 16.

The amount of torque for a given angular position of the door 16 may be selected from a range of available torques to allow a user to fine-tune his or her preferences. Additionally, or alternatively, the user may assign a predetermined torque setting to a given angular door position should he or she desire a relatively easier set-up process. Examples of torque settings include a low torque setting, a medium torque setting, a high torque setting, and so on. The selection(s) made by the user may be stored as a torque profile in memory 116 and incorporated into instructions 118. By allowing a user to program the amount of torque applied by the motor 92 to the door 16, the user is able to customize the manner in which the motor 92 assists with the opening and closing of the door 16 based on his or her strength levels along with any other considerations such as whether the vehicle 12 is on an incline, decline, or substantially flat surface. As such, it is contemplated that multiple torque profiles may be saved and implemented based on a position and/or an operational environment of the vehicle 12 along with any needs of the user. A given torque profile may be selected manually via the user-input device 122 or automatically selected by the controller 110. In determining which torque profile to select, the controller 110 may rely on information provided from a variety of vehicle equipment 126, which may include sensors (e.g., accelerometer) or sensor systems, global positioning systems, and any other equipment for assessing information related to vehicle positioning, door positioning, and/or an operational environment of the motor vehicle 12.

In operation, the controller 110 communicates with a sensor system 130 that includes a position sensor 132 and a door sensor 134. For the first embodiment of the power assist device 10 described above, the position sensor 132 may be a separate device that measures the linear displacement inwardly and outwardly of either the drive cylinder 158 or the exteriorly extending shaft 162. Since such displacement is directly correlated to that of the door 16 by virtue of their mechanical coupling, the controller 110 is able to deduce the angular position and swing direction of the door 16 based on angular position information 136 reported by the position sensor 132, thereby enabling the controller 110 to control the motor 92 according to selections made by a user or a default setting. In the case of the second embodiment of the power assist device 10 described above, the position sensor 132 may be operatively coupled to the distal portion or drive shaft 80A of output shaft 80 for sensing an angular position of the distal portion or drive shaft 80A of the output shaft 80. That is, in the second embodiment of the power assist device 10, the angular displacement of the distal portion or drive shaft 80A of the output shaft 80 is directly correlated to that of the door 16 by virtue of their mechanical coupling.

In some instances, instead of generating torque, the motor 92 may operate to resist torque applied to the door 16 from a source independent of the motor 92, such as torque exerted on the door 16 by a user or torque arising from environmental conditions, such as wind and gravity (due to the vehicle 12 being on an incline or decline). According to one embodiment, the controller 110 controls a mechanical resistance applied by the motor 92 to the door 16 to resist door swing. The amount of mechanical resistance may be specified via the user-input device 122 and be a function of an angular position of the door 16. The amount of mechanical resistance for a given angular position of the door 16 may be selected from a range of available mechanical resistances or predetermined settings. Additionally or alternatively, the amount of mechanical resistance may be a function of a door swing direction, thereby allowing a user to make mechanical resistance selections based on whether the door 16 is being opened or closed. The mechanical resistance(s) specified by a user may be stored as resistance profiles in memory 116 and implemented by the controller 110 through manual or automatic activation. The controller 110 may call upon a given resistance profile based on factors including a position of the motor vehicle 12, a door position, and/or an operating environment of the vehicle 12.

The door sensor 134 is operatively coupled to the door 16 for sensing a position of the door 16, such as whether the door 16 is in an opened or a closed position. In tracking the position of the motor 92, the controller 110 may reset the angular position of the motor 92 to zero whenever the door 16 is in a closed position, as indicated by door information 138 provided to the controller 110 from door sensor 134.

In operation, the controller 110 may control the motor 92 to apply mechanical resistance in a variety of manners. According to one embodiment, the controller 110 is configured to partially or fully short the field component 106 thereby making it more difficult to turn the armature 108. The resulting mechanical resistance is generally sufficient for a user desiring an increase in mechanical resistance when opening or closing a door 16 so as to prevent the door 16 from swinging too quickly. When a user is closing the door 16, the added mechanical resistance helps to prevent the door 16 from slamming against the body of the vehicle 12. Similarly, when a user is opening the door 16, the added mechanical resistance helps to prevent the door 16 from travelling too quickly and potentially colliding with an object before the user becomes aware. If desiring to detain the door 16 (e.g., creating a controlled detent), the controller 110 may apply current only to the field component 106 to further increase the difficulty in turning the armature 108. Should a higher holding torque be desired, such as when the vehicle 12 is located on a steep incline, the controller 110 may control the motor 92 using position control feedback. Another situation where a higher holding torque is desirable involves instances where the door 16 is used to assist with egress and ingress from the motor vehicle 12. For example, some people, such as the elderly, use doors to support themselves while entering or exiting the motor vehicle 12. If the door 16 is not in a detained position, the door 16 may swing causing the person to lose his or her balance. This problem is alleviated by creating a controlled detent at the appropriate door position. Thus, by virtue of the aforementioned control schemes, a user is provided with a greater flexibility in controlling door swing behavior. Furthermore, due to the programmability of the power assist device 10 described herein, conventional mechanical detents are no longer needed. In instances where current applied to the motor 92 becomes excessive, the controller 110 may shut down power delivery to the motor 92 to allow the door 16 to move to the direction limit.

Accordingly, by operatively coupling a motor 92 to a door 16 and controlling the motor 92 based on one or more user-inputted selections made through a user-input device 122, a user is able to control the door swing of the door 16. As described herein, selections made by the user may result in the motor 92 being controlled to apply a torque to the door 16 in order to assist the user with opening or closing the door 16. Alternatively, selections made by the user may result in the motor 92 being controlled to apply a mechanical resistance to the door 16 in order to resist door swing. Control of the motor 92 may occur manually or automatically using a controller 110. While controlling the motor 92, the controller 110 may receive signals from vehicle equipment 126 to ensure proper motor functionality. Selections made by the user may be stored as torque and resistance profiles that are retrieved based on a variety of considerations. In this manner, a user is provided the ability to customize the manner in which a door 16 behaves to better suit his or her needs.

As an additional feature of the present disclosure, improved soft close functionality can be obtained in the case of the door being operated in a manual mode. Heretofore, the door 16 has been controlled at all times by operation of the motor 92. In such a power mode of operation, a first criterion is that the door 16 has to close softly to enable the cinch motor 128 to capture the B pillar and draw the door from a secondary latch position to a primary latch position. A second criterion is that the door 16 has to open to the maximum allowable position without hitting an object.

Most importantly, the door 16 must be under control at all times. However, in certain circumstances, it may be advantageous to allow the user to operate the door 16 in the conventional manual manner without the motor 92 controlling the opening or closing of the door 16. In such a case, however, it is necessary to uncouple the door 16 from the motor 92 to provide the manual mode and reengaged the motor 92 with the door 16 to provide the power mode. If the door 16 is manually opened at high speeds or urged by a wind gust to a high-speed, the controller 110 needs to be able to slow and/or stop the door 16 before the door 16 hits an object. If the door 16 is manually closed at a high speed, the controller 110 needs to bring the door 16 to a controlled angular velocity before reaching reference point 30B, which, as noted above, is approximately at 117 mm in order to prevent the door 16 from being allowed to slam.

To this end, a soft close system is disclosed for use in conjunction with manual door closure, to control the speed and force with which the door is closed. When activated, the soft close system will complement manual operation and at certain positions and/or conditions, drive the door 16 at a reduced force and speed until it reaches its secondary latch position. The soft close system is preferably active in three modes of operation: (1) an auto closing mode; (2) a manual closing mode; and (3) a door slam closing mode.

In the auto closing mode, as described above, the power assist device 10 maintains the closing speed of the door 16 as the door 16 closes. When the door 16 reaches the "Soft Close" Activation Point, the power assist device 10 begins the slowdown of the door closing speed until the door 16 has reached the secondary latch position or reference point 30B. The a cinch motor 128 is then used to drive the door 16 from the secondary latch position, or reference point 30B, to the primary latch position, or reference point 30C. Control of the angular velocity of the door closing can be achieved by using Pulse Width Modulation (PWM) techniques, where the angular position of the door 16 is determined by the count of Hall effect sensor pulses which are generated as the door 16 moves.

The manual closing mode is conceptually an assisted auto closing mode, where the user is presented with a manual door operation experience but where the angular velocity of the closure of the door 16 is controlled to be within a pre-defined range of angular velocities that have been deemed to be "normal" and unlikely to cause an unpleasant door operation experience. During Manual Closing Mode, the controller 110 releases a clutch 148 that otherwise couples the motor shaft 80B of the motor 92 with the drive shaft 80A, thereby allowing the door 16 to close at a manual speed dictated by the user. As the door 16 approaches the soft close activation point, or reference point 30B, the controller 110 engages the clutch 148 and the controller 110 begins to slow down the angular velocity of the door 16 until the door 16 reaches the secondary latch position, or reference point 30C. The cinch motor 128 then drives the door 16 from the secondary latch position, or reference point 30B, to the primary latch position point, or reference point 30C. Again, control of the angular velocity of the door 16 closing is obtained through PWM techniques.

In the door slam closing mode, the controller 110 overrides the manual closing mode when the angular velocity of the door 16 during the door closing event exceeds a predefined range of angular velocities that have been deemed to be above "normal" and likely to cause an unpleasant door operation experience. During door slam closing mode, the controller 110 actuates the clutch 148, thereby engaging the motor shaft 80B of the motor 92 with the drive shaft 80A. The controller 110 thus allows the motor 92 to engage the door 16 and assume control of the door 16, even though the initiation of the door closing the event was done manually and potentially at a relatively high angular velocity.

In order to accomplish the door slam closing mode, in the event that the door exceeds the predetermined angular velocity, the controller 110 activates the braking assembly 160 as the door 16 reaches the braking activation point or the range of locations designated as reference point 30B'. Once the braking assembly 160 is engaged, the controller 110 can apply a braking force to the unclutched drive shaft 80A, which is rotating at a relatively high speed. When the braking is completed, the controller 110 can engage the clutch 148 and begin driving the door 16 to and passed the soft close activation point, or reference point 30B, at a slow closing angular velocity until it has reached the secondary latch position, or reference point 30C. The cinch motor 128 then drives the door 16 from the secondary position, or reference point 30B, to the primary position, or reference point 30D. Again, control of the angular velocity door 16 closing is obtained through PWM techniques.

The braking assembly 160 can be designed to be responsive to several inputs. As noted above, the braking assembly 160 can be activated in the case of a door slamming event presented by an excessive angular velocity of the door. The braking assembly 160 can also be used to control the applied force through monitoring the angular acceleration of the door 16 throughout a door closing or opening event. For example, as noted above, the braking assembly 160 can be actuated when a door 16 is slammed during manual operation. Additionally, the braking assembly 160 can be actuated in the event that a gust of wind suddenly pushes the door 16 to an opened position or if the motor vehicle 12 is parked at an incline and the door 16 suddenly moves to an opened position while in the manual mode. Thus, the braking assembly 160 of the present disclosure can be beneficially employed both during a door opening or closing event.

In order to accomplish the foregoing objectives, the motor shaft 80B of the motor 92 is selectively coupled to the distal portion or drive shaft 80A of the power assist device 10 operably coupled to the door 16. The clutch 148 is interposed between the distal portion or drive shaft 80A and the proximal portion or motor shaft 80B. Each of the drive shaft 80A and motor shaft 80B have an angular velocity, and depending upon the relative angular velocity between the drive shaft 80A and motor shaft 80B, the motor 92 may be operatively coupled with and decoupled from the door 16. The brake assembly 160 is disposed and thus employed to synchronize the angular velocities of the drive shaft 80A and motor shaft 80B, thereby allowing the clutch 148 to operatively couple the motor 92 with the door 16.

Accordingly, the clutch 148 is used for selective transmission of rotational power to allow the door 16 to be operated manually, which in some cases might actually be faster. In order to do so, the clutch 148 is released to allow the door 16 to swing freely. This is also advantageous in the event that the power supply for the power assist device 10 is interrupted or if the battery has been fully discharged. In such events, it is preferable that the clutch 148 be designed to automatically release. However, even while in the manual mode, there may be a need to bring the door 16 to a stop or to break the door 16 to slow its angular rotation.

Thus, when the user actuates user input device 122 to place the door 16 in the manual closing mode during a door closing event, the clutch 148 decouples the motor 92 from the door 16. Conversely, when the user places the door 16 in the power mode or auto assisted mode, or in the event that the door slamming mode is triggered, the clutch 148 operably couples the motor 92 with the door 16.

Where the clutch 148 is already employed to place the door 16 in the manual mode and it is necessary to engage the clutch 148 to place the door 16 in the power or door system mode, the clutch 148 must be rapidly engaged to connect the drive shaft 80A and motor shaft 80B. As the drive shaft 80A and motor shaft 80B may be operating at different speeds at this point, rapid engagement of the clutch 148 could possibly damage the mechanical coupling capability of the clutch 148. Accordingly, a solution for rapid engagement of the clutch 148 to switch the door 16 from the manual mode to the power mode or door assist mode, as disclosed herein, is required.

In particular, where the angular position of the door is within a predefined range of angular positions depicted as the range within reference point 30B', the controller 110 monitors the angular velocity of the door 16. As noted above, the predefined range of angular positions includes a first angular position corresponding to an opened door position and a second angular position corresponding to a soft close activation angular position. The controller 110 allows operation of the door 16 in the manual closing mode when the angular velocity of the door 16 is within this predefined range.

Upon reaching the soft close activation angular position depicted as reference point 30B, the controller 110 actuates the brake assembly 160 to synchronize the angular velocity of the drive shaft 80A and motor shaft 80B. Once synchronized, the controller 110 actuates the clutch 148 to place the door 16 in the assisted closing mode and, if necessary to control the angular velocity of the door 16, the controller 110 actuates the motor 92 to further control the door closing event. If the angular velocity the door 16 is within control limits, actuation of the motor 92 is not necessary. In either case, as the door 16 passes through the second angular position and moves toward a third angular position corresponding to a cinch motor activation position, the door closing event is controlled by a cinch motor 128 to drive the door 16 from a secondary latch position to a primary latch position.

It should be appreciated that the predefined range of angular velocities within which the door assembly control system will allow the door 16 to be operated in the manual mode includes a first angular velocity corresponding to a static door position and a second angular velocity corresponding to a brake initiation angular velocity. As noted above, for purposes of this disclosure, preferably any angular velocity of the door above of 5 rpm (30°/sec) is the brake initiation angular velocity and will trigger actuation of the brake assembly 160. Upon reaching the brake initiation angular velocity during the door closing event, the controller 110 actuates the brake assembly 160 to synchronize the angular velocity of the drive shaft 80A and motor shaft 80B. The controller 110 then actuates the clutch 148 to place the door 16 in the assisted closing mode, and the controller 110 actuates the motor 92 to further control the door closing event. Also, although between the second angular position and the third angular position, the door closing event is controlled by the motor 92, and whereby passed the third angular position, the door closing event is controlled by a cinch motor 128 to drive the door 16 from a secondary latch position to a primary latch position, it should be noted that the motor 92 and the cinch motor 128 can comprise the same motor drive device. Preferably, and as shown in FIG. 3 and described above, a separate cinch motor 128 is provided.

The operation of the braking assembly 160 can be obtained through multiple operating systems. However, in one preferred braking assembly operating system, the controller 110 actuates the brake assembly 160 to slow the angular velocity of the drive shaft 80A to synchronize the angular velocity of the drive shaft 80A and motor shaft 80B. In another preferred braking assembly operating system, the controller 110 actuates the brake assembly 160 to actuate the motor 92 and thereby increase the angular velocity of the motor shaft 80B to match that of the driveshaft 80A and thereby synchronize the angular velocity of the drive shaft 80A and motor shaft 80B. Both of the preferred braking assemblies 160 are discussed below.

The first preferred embodiment of the braking assembly 160 employs a pair of magnetic disks 170, 172 having opposite polarity in proximate disposition, where the first disc 170 rotates with the drive shaft 80A and the second disc 172 is fixed in location relative the first disc 170. Preferably, the first disc 170 is securely mounted to and rotates with the drive shaft 80A within the cylindrical body portion 90 and is provided with a plurality of permanent magnets 174 having a first polarity disposed in regular intervals about a circumference of the first disc 170. The first disc 170 thus rotates at the same angular velocity as does the drive shaft 80A. Since the drive shaft 80A is free to rotate after the clutch 148 has been disengaged, the first disc 170 is similarly free to rotate after the clutch 148 has been disengaged.

The second disc 172 does not move and is fixedly mounted within the cylindrical body position 90 and in operational proximity to the first disc 170. The second disc 172 is provided with an equal plurality of electromagnets 176 having a second polarity disposed about a circumference of the second disc 172. The first polarity of the plurality of permanent magnets 174 is opposite the second polarity of the plurality of electromagnets 176. Preferably an even number, between eight and twelve, of permanent magnets 174 is mounted on the first disc 170, and an equal number of electromagnets 176 are mounted on the fixed second disc 172.

As shown in FIG. 6, the permanent magnets 174 on the first disc 170 preferably have a north pole polarity. In the event that the controller 110 determines that the door 16 should be removed from the manual mode and placed in the power mode or door assist mode based on a predetermined door angular velocity or a predetermined door angular position, the plurality of electromagnets 176 disposed on the second disc 172 are energized to a south pole polarity. Each of the permanent magnets 174 on the first disc 170 and the electromagnets 176 on the second disc 172 thus attract each other and, given their close proximity, provide a braking effect. That is, the plurality of electromagnets 176 disposed on the second disc 172 is energized upon the occurrence of a predetermined door angular velocity corresponding to a predetermined door slam closing angular velocity. Likewise, the plurality of electromagnets 176 disposed on the second disc 172 is energized upon the occurrence of a predetermined door angular velocity corresponding to a predetermined wind gust angular velocity. In any event, the plurality of electromagnets 176 disposed on the second disc 172 is preferably energized upon the occurrence of a door angular position corresponding to a soft close activation position.

In the first embodiment of the power assist device 10 shown in FIGS. 4A-4E and 6, when in the manual mode, movement of the door 16 in either the opening direction or closing direction causes displacement of the externally extending shaft 162 actually within the power assist device 10. The drive cylinder 158 and threaded drive nut 144 are thus caused to move axially within the power assist device 10. As a result, the threaded drive nut 144, being actually displaced within the power assist device 10, causes the threaded shaft 100 on the drive shaft 80A to rotate at an angular velocity proportional to the speed of the door 16 opening or closing. Since the drive shaft 80A is decoupled from the motor shaft 80B, there is no resistance to rotation of the drive shaft 80A, so long as the system remains in the manual mode.

However, whenever the door 16 is to be removed from the manual mode, the first embodiment of the braking assembly 160 is engaged, and the rotation of the threaded shaft 100 on the driveshaft 80A is slowed, along with the rotational velocity of the door 16. When rotation of the drive shaft 80A relative the second disc 172 comes to a stop or at least reaches an angular velocity at which the clutch 148 could be safely engaged, the clutch 148 can be rapidly engaged and the motor 92 can be employed to control further movement of the door 16.

In the case of the second embodiment of the power assist device 10 shown in FIG. 5B, when in the manual mode, movement of the door 16 in either the opening direction or closing direction causes the gear rack 208 in the extending check strap arm 206 to rotate the driven gear 204. As a result, the drive shaft 80A coupled to the driven gear 204 is caused to rotate at an angular velocity proportional to the speed of the door 16 opening or closing. Again, with the drive shaft 80A decoupled from the motor shaft 80B, there is no resistance to rotation of the drive shaft 80A, so long as the system remains in the manual mode.

To discontinue the manual mode, the first embodiment of the braking assembly 160 is engaged and rotation of the driveshaft 80A is slowed, along with the rotational velocity of the door 16. When rotation of the drive shaft 80A relative the second disc 172 comes to a stop or at least reaches an angular velocity at which the clutch 148 could be safely engaged, the clutch 148 can be rapidly engaged and the motor 92 can be employed to control further movement of the door.

Each of the lower end of the drive shaft 80A and the upper end of the motor shaft 80B are preferably provided with axially disposed splines (not shown) adapted for rotational transmission of power when coupled, as is known in the art. In turn, the clutch 148 is provided with matching internal splines and may be slidably mounted on the upper end of the motor shaft 80B. Thereon, the clutch 148 may be selectively and axially displaced by the controller 110 through a clutch solenoid 150 between an engaged position, in which the clutch 148 engages the splines of both the drive shaft 80A and the motor shaft 80B, and a disengaged position, in which the clutch 148 is axially actually slid out of engagement with the splines on the lower end of the drive shaft 80A. Alternatively, a friction coupling can be utilized.

The second preferred embodiment of the braking assembly 160 takes the opposite approach and can be likewise applied to either the first or second embodiment of the power assist device 10, as described above in the context of the first embodiment of the preferred braking assembly 160. However, rather than retarding or slowing the angular velocity of the drive shaft 80A operably coupled with the door 16, the angular velocity of the motor shaft 80B operably coupled to the motor 92 is increased to match that of the drive shaft 80A. When the relative angular velocity between the drive shaft 80A and motor shaft 80B is at zero or low enough to otherwise prevent damage, the clutch 148 is caused to engage both shafts 80A, 80B. Once the clutch 148 has been engaged, the motor 92 can take control of the system and control the angular velocity of the door 16, either opening or closing, as discussed above.

As in the first preferred embodiment of the braking assembly 160, the drive shaft 80A is free to rotate in proportion with rotation of the door 16. A first disc 190 with gear teeth 192 disposed about its outer circumference is attached to the drive shaft 80A likewise rotates in proportion to the door 16. Hall effect sensors 194 are disposed proximate the outer circumference of the first disc 190 to sense the frequency of the pulses created by the interaction between the gear teeth 192 and the Hall effect sensors 194, which thereby provide the angular velocity of the first disc 190 when the drive shaft 80A is rotating. Thus, a first angular velocity of the first disc 190, attached drive shaft 80A, and the door 16 is reported to the controller 110. Likewise, the angular position of the door 16 can be obtained.

A second disc 196 is mounted to the motor shaft 80B. The second disc 196 is likewise provided with gear teeth 198 about its outer circumference, and Hall effect sensors 200 are disposed proximate the outer circumference of the second disc 196 to sense the frequency of the pulses created by the interaction between the gear teeth 198 and the Hall effect sensors 200 thereby indicating the angular velocity of the second disc 196 when the motor shaft 80B is rotating. Thus, a second angular velocity of the second disc 196 is reported to the controller 110. The controller 110 then compares the output of the first set of Hall effect sensors 194 with the output of the second set of Hall effect sensors 200 to determine when the angular velocities of the first and second discs 190, 196 are the same or sufficiently close to prevent damage of the clutch 148 if it is used to engage the drive shaft 80A and motor shaft 80B.

In operation, the controller 110 energizes the motor 92 to increase the angular velocity of the motor shaft 80B to synchronize the angular velocity of the drive shaft 80A and motor shaft 80B upon the occurrence of a predetermined door angular velocity corresponding to a predetermined door slam closing angular velocity to discontinue the manual mode. Likewise, the controller 110 energizes the motor 92 to increase the angular velocity of the motor shaft 80B to synchronize the angular velocity of the drive shaft 80A and motor shaft 80B upon the occurrence of a predetermined door angular velocity corresponding to a predetermined wind gust angular velocity. In any event, the controller 110 energizes the motor 92 to increase the angular velocity of the motor shaft 80B to synchronize the angular velocity of the drive shaft 80A and motor shaft 80B upon the occurrence of a door 16 angular position corresponding to the soft close activation position. When rotation of the motor shaft 80B is increased to match that of the drive shaft 80A, or at least obtain a relative angular velocity at which the clutch 148 could be safely engaged, the clutch 148 can be rapidly engaged and the motor 92 can be employed to control further movement of the door 16.

Thus, the present disclosure provides method of selectively controlling the door swing of a door 16 that is operatively coupled to a motor vehicle 12 via a linear motor or a check strap motor. The methods includes the process step of sensing the angular velocity of the door 16 during a door opening or closing event and the angular velocity of the motor 92 of the power assist device 10 and providing the angular velocity of the door 16 during a door opening or closing event and the angular velocity of the motor 92 of the power assist device 10 to a controller. A clutch 148 is interposed between the drive shaft 80A and a motor shaft 80B for alternating the door 16 between a power mode, wherein the motor 92 of the power assist device 10 is operatively coupled to the door 16, and a manual mode, wherein the motor 92 of the power assist device 10 is decoupled from the door 16, and wherein each of the drive shaft 80A and the motor shaft 80B has an angular velocity. The brake assembly 160 is interposed between the motor 92 of the power assist device 10 and the door 16. The brake assembly 160 synchronizes the angular velocity of the drive shaft 80A and the motor shaft 80B when in the manual mode to allow the clutch 148 to place the door 16 in the power mode.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

We claim:

1. A motor vehicle door comprising:

a controller for controlling a motor selectively coupled to the door and a clutch interposed between a drive shaft and a motor shaft, each having an angular velocity, whereby the motor is operatively coupled with and decoupled from the door; and a brake assembly disposed to synchronize the angular velocities of the drive shaft and the motor shaft allowing the clutch to operatively couple the motor with the door.

2. The motor vehicle door of claim 1, wherein during a door closing event the door has a manual closing mode, wherein the clutch decouples the motor from the door, and an assisted closing mode, wherein the clutch operably couples the motor with the door.

3. The motor vehicle door of claim 2, wherein the door has an angular velocity and an angular position, wherein the controller operates the door in the manual closing mode when the angular velocity of the door is within a predefined range of angular velocities and the angular position of the door is within a predefined range of angular positions.

4. The motor vehicle door of claim 3, wherein the predefined range of angular positions includes a first angular position corresponding to an open door position and a second angular position corresponding to a soft close activation angular position, whereby upon reaching the soft close activation angular position during the door closing event, the controller actuates the brake assembly to synchronize the angular velocity of the drive shaft and motor shaft, the controller actuates the clutch to place the motor vehicle door in the assisted closing mode, and the controller actuates the motor to further control the door closing event.

5. The motor vehicle door of claim 4, wherein the predefined range of angular positions further includes a third angular position corresponding to a cinch motor activation position, wherein between the second angular position and third angular position, the door closing event is controlled by the motor, and whereby past the third angular position, the door closing event is controlled by a cinch motor to drive the door from a secondary latch position to a primary latch position.

6. The motor vehicle door of claim 3, wherein the predefined range of angular velocities includes a first angular velocity corresponding to a static door position and a second angular velocity corresponding to a brake initiation angular velocity, whereby upon reaching the brake initiation angular velocity during the door closing event, the controller actuates the brake assembly to synchronize the angular velocity of the drive shaft and motor shaft, the controller actuates the clutch to place the motor vehicle door in the assisted closing mode, and the controller actuates the motor to further control the door closing event.

7. The motor vehicle door of claim 6, wherein the predefined range of angular positions includes a first angular position corresponding to an open door position, a second angular position corresponding to a soft close activation angular position, and a third angular position corresponding to a cinch motor activation position, wherein between the second angular position and the third angular position, the door closing event is controlled by the motor, and whereby past the third angular position, the door closing event is controlled by a cinch motor to drive the door from a secondary latch position to a primary latch position.

8. The motor vehicle door of claim 3, wherein the controller actuates the brake assembly to slow the angular velocity of the drive shaft to synchronize the angular velocity of the drive shaft and motor shaft.

9. The motor vehicle door of claim 3, wherein the controller actuates the brake assembly to increase the angular velocity of the motor shaft to synchronize the angular velocity of the drive shaft and motor shaft.

10. The motor vehicle door of claim 1, the brake assembly comprising a first disc having a plurality of permanent magnets having a first polarity disposed in regular intervals about a circumference of the first disc and a second disc in operational proximity to the first disc having an equal plurality of electromagnets having a second polarity disposed about a circumference of the second disc, wherein the first polarity of the plurality of permanent magnets is opposite the second polarity of the plurality of electromagnets.

11. The motor vehicle door of claim 10, wherein the first disc is operably coupled with the drive shaft and the second disc is fixedly coupled with the motor, and wherein the plurality of electromagnets disposed on the second disc are energized upon an occurrence of a predetermined door angular velocity or a predetermined door angular position.

12. The motor vehicle door of claim 11, wherein the plurality of electromagnets disposed on the second disc are energized upon the occurrence of a predetermined door angular position corresponding to a soft close activation position.

13. The motor vehicle door of claim 11, wherein the plurality of electromagnets disposed on the second disc are energized upon the occurrence of a predetermined door angular velocity corresponding to a predetermined door slam closing angular velocity.

14. The motor vehicle door of claim 11, wherein the plurality of electromagnets disposed on the second disc are energized upon the occurrence of a predetermined door angular velocity corresponding to a predetermined wind gust angular velocity.

15. The motor vehicle door of claim 1, the brake assembly comprising a first disc further comprising a first angular velocity sensor and a second disc further comprising a second angular velocity sensor, wherein the controller compares an output of the first angular velocity sensor and an output of the second angular velocity sensor and the controller actuates the brake assembly to synchronize the rotational velocity of the drive shaft and motor shaft upon an occurrence of a predetermined door angular velocity or a predetermined door angular position, and thereafter the controller actuates the clutch to place the motor vehicle door in an assisted closing mode.

16. The motor vehicle door of claim 15, wherein the first disc is operably coupled with the drive shaft and the second disc is operably coupled with the motor shaft, and wherein the controller actuates the brake assembly to increase the angular velocity of the motor shaft to synchronize the angular velocity of the drive shaft and motor shaft.

17. A motor vehicle door assembly comprising:

a door; and a selective power assist device having a manual mode and a power mode, the selective power assist device comprising:

a motor selectively operatively coupled to the door when in the power mode;

a clutch interposed between the motor and the door;

a brake assembly; and a controller for controlling the motor, the clutch, and the brake assembly;

wherein the controller actuates the brake assembly upon an occurrence of a predetermined door angular velocity or a predetermined door angular position to thereby alternate the selective power assist device between the manual mode, wherein the clutch is actuated to an disengaged position and the motor is operatively decoupled from the door, and the power mode, wherein the clutch is actuated to an engaged position and the motor is coupled from the door.

18. The motor vehicle door assembly of claim 17, wherein the controller actuates the brake assembly to retard an angular velocity of a drive shaft to synchronize the angular velocity of the drive shaft and an angular velocity of a motor shaft upon the occurrence of the predetermined door angular velocity or a predetermined door angular position, and thereafter the controller actuates the clutch to place the motor vehicle door in the power mode.

19. The motor vehicle door assembly of claim 17, wherein the controller actuates the brake assembly to increase the angular velocity of a motor shaft to synchronize the angular velocity of a drive shaft and the motor shaft upon the occurrence of the predetermined door angular velocity or the predetermined door angular position, and thereafter the controller actuates the clutch to place the motor vehicle door in the power mode.

20. A method of controlling a door swing of a motor vehicle door, the method comprising the steps of:

selectively and operatively coupling a door of a motor vehicle to a power assist motor;

sensing the angular velocity of the door during a door opening or closing event and the angular velocity of the power assist motor;

providing the angular velocity of the door during a door opening or closing event and the angular velocity of the power assist motor to a controller;

interposing a clutch between a drive shaft and a motor shaft for alternating the motor vehicle door between a power mode, wherein the power assist motor is operatively coupled to the door, and a manual mode, wherein the power assist motor is decoupled from the door, and wherein each of the drive shaft and the motor shaft has an angular velocity; and interposing a brake assembly between the power assist motor and the door, wherein the brake assembly synchronizes the angular velocity of the drive shaft and the motor shaft when in the manual mode to allow the clutch to place the motor vehicle door in the power mode.

* * * * *